United States Patent
Oya

(10) Patent No.: US 7,604,852 B2
(45) Date of Patent: Oct. 20, 2009

(54) CELLULOSE ACYLATE FILM AND PROCESS FOR PRODUCING THE SAME, AND OPTICAL FILM AND IMAGE DISPLAY DEVICE USING THE CELLULOSE ACYLATE FILM

(75) Inventor: Toyohisa Oya, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 693 days.

(21) Appl. No.: 11/226,383

(22) Filed: Sep. 15, 2005

(65) Prior Publication Data

US 2006/0066011 A1 Mar. 30, 2006

(30) Foreign Application Priority Data

| Sep. 22, 2004 | (JP) | ............... P.2004-275028 |
| Dec. 1, 2004 | (JP) | ............... P.2004-348840 |
| May 26, 2005 | (JP) | ............... P.2005-154351 |

(51) Int. Cl.
*C09K 19/52* (2006.01)
*C08L 1/14* (2006.01)
*B32B 23/20* (2006.01)

(52) U.S. Cl. .............. 428/1.2; 428/532; 428/533; 428/536; 106/171.1; 536/64; 536/65; 536/68

(58) Field of Classification Search ............ 106/171.1; 536/64, 65, 68; 428/532, 533, 536, 1.2; 524/401
See application file for complete search history.

(56) References Cited

U.S. PATENT DOCUMENTS 6,211,358 B1 * 4/2001 Honda et al. ............... 536/64
2006/0062935 A1 * 3/2006 Murakami ............... 428/1.31

FOREIGN PATENT DOCUMENTS

| JP | 2000-352620 | * | 12/2000 |
| JP | 2000-352620 A | | 12/2000 |
| JP | 2001-188128 A | | 7/2001 |
| JP | 2002-131536 | * | 5/2002 |

OTHER PUBLICATIONS

Catalogue of Eastman Chemical Co. (1994).

* cited by examiner

*Primary Examiner*—David M Brunsman
(74) *Attorney, Agent, or Firm*—Birch, Stewart, Kolasch & Birch, LLP

(57) ABSTRACT

A process for producing a cellulose acylate film, the process comprising melt-cast filming a composition comprising a cellulose acylate that has a specific acyl substitution degree, and that has a residual sulfate in an amount equal to or less than a definite amount (in terms of an amount of a sulfur atom), and a a cellulose acylate film produced by the process, a high-quality retardation film, a polarizing plate, an optical compensatory film, an anti-reflective film and an image display device using same.

18 Claims, No Drawings

CELLULOSE ACYLATE FILM AND PROCESS FOR PRODUCING THE SAME, AND OPTICAL FILM AND IMAGE DISPLAY DEVICE USING THE CELLULOSE ACYLATE FILM

BACKGROUND OF THE INVENTION

1. Field of the Invention

The present invention relates to a cellulose acylate film having an excellent transparency adapted for optical film and a process for producing the same, and to an optical film using the cellulose acylate film and an image display device.

2. Description of the Related Art

Cellulose acylate is used as a support for a photographic light-sensitive material due to its transparency, toughness and optical isotropy, and has an enlarging use as an optical film for use in image display devices including a liquid crystal display device and an organic EL display device. As an optical film for use in a liquid crystal display device, it is used as a protective film for a polarizing plate, or there has been practiced a method of stretching the film to generate in-plane retardation (Re) and retardation in the thickness direction (Rth) to prepare a retardation film for use in a liquid crystal display device of, for example, STN (Super Twisted Nematic) system.

In recent years, display elements of VA (Vertical Alignment) system and OCB (Optical Compensated Bend) system requiring a larger retardation of Re or Rth than STN system have been developed, and an optical film material excellent in generating an enough retardation is being required.

As a novel optical film material for meeting such requirement, there has been disclosed a solution cast film using a mixed ester of cellulose containing both acetyl group and propionyl group (cellulose acetate propionate)(JP-A-2001-188128). Also, since the melting point of cellulose acetate butyrate or cellulose acetate propionate is lower than that of cellulose acetate, there has been disclosed a method of using an optical film formed by melt-cast filming these cellulose acylates (JP-A-2000-352620). In comparison with the solution filming process, the melt-cast film production process has the advantages that it can eliminate the dissolving step and the drying step and that it imposes a less load on the environment.

As commercially available products of the cellulose acylates other than cellulose acetate, various cellulose acetate butyrate and cellulose acetate propionate have been disclosed for molding or painting use (Catalogue of Eastman Chemical Co. (1994)).

SUMMARY OF THE INVENTION

Cellulose acylates such as cellulose acetate butyrate and cellulose acetate propionate described in related patents or documents have been developed mainly for forming a film by a solution coating process or a solution filming process. These cellulose acylates, however, have involved a problem that, though they provide a sufficient transparency in the case of forming a cast film by the solution coating process or the solution filming process, coloration takes place in the case of being used as starting materials for melt-cast film production process, such coloration being unsuitable for the use of optical film which requires a high transparency.

Therefore, an object of the invention is to provide a cellulose acylate film being suited for optical film and having an excellent transparency, which is produced by the melt-cast film production process and which does not cause coloration.

A further object of the invention is to provide a high-quality retardation film, a polarizing plate, an optical compensatory film, an antireflective film and an image display device from the acylate film.

As a result of intensive investigations with noting the fact that it is necessary to heat to a high temperature of 100 to 350° C. upon melting a cellulose acylate, the inventors have found that, with some compositions of cellulose acylate or some production processes, there can result a poor heat stability or a poor adaptability for melt-cast film production process such as melting temperature and melt viscosity.

As a further investigation, the inventors have found that a cellulose acylate having a total acyl substitution degree within a specific range, a combination of an acetyl group and an acyl group having from 3 to 7 carbon atoms each within a specific range and having a residual sulfate in an amount (in terms of amount of sulfur atom) within, or less than, a specific range can provide both a good heat stability and a good adaptability for the melt-cast film production process and can solve the problem of unfavorable coloration to yellow or dark brown or, in a serious case, to black to be caused upon subjecting the cellulose acylate to the melt-cast film production process can be solved. Also, the above-mentioned advantages of the invention become more remarkable when the amount of residual metal of the cellulose acylate is within a specific range.

Thus, the above-described objects of the invention can be attained by the following constitution.

(1) A process for producing a cellulose acylate film, the process comprising:

melt-cast filming a composition comprising a cellulose acylate that has an acyl substitution degree satisfying numerical formulae (1) to (3), and that has a residual sulfate in an amount of from 0 to 500 ppm (in terms of an amount of a sulfur atom):

$2.0 \leq A+B \leq 3$      numerical formula (1)

$0 \leq A \leq 2.5$      numerical formula (2)

$0.3 \leq B \leq 3$      numerical formula (3)

wherein A represents a substitution degree of an acetyl group; and

B represents a sum of a substitution degree of an acyl group having 3 to 7 carbon atoms.

(2) The process-as described in (1) above, wherein the acyl group having 3 to 7 carbon atoms in the cellulose acylate is a propionyl group or a butyryl group.

(3) The process as described in (1) or (2) above, wherein an amount of the residual sulfate is from 0 to 300 ppm (in terms of an amount of a sulfur atom).

(4) The process as described in any of (1) to (3) above, wherein the cellulose acylate has a plurality of residual metals in an amount of (M1+M2) satisfying numerical formula (4):

$0 \text{ ppm} < M1 + M2 < 1000 \text{ ppm}$      numerical formula (4)

wherein M1 represents an amount of an alkali metal; and M2 represents an amount of a group II metal.

(5) The process as described in any of (1) to (4) above, wherein the cellulose acylate has a metal/sulfur equivalent ratio that is given by numerical formula (5) in a range of from 0.25 to 3:

metal/sulfur equivalent ratio=((an amount of $M1$ in terms of moles/2)+an amount of $M2$ in terms of moles)/an amount of $S$ in terms of moles    numerical formula (5)

wherein M1 represents an amount of an alkali metal;

M2 represents an amount of a group II metal; and

S represents an amount of a residual sulfate of the cellulose acylate (in terms of an amount of a sulfur atom).

(6) The process as described in any of (1) to (5) above, wherein the cellulose acylate has a bulk density of from 0.7 to 1.2.

(7) The process as described in any of (1) to (6) above, wherein the cellulose acylate has a weight-average polymerization degree/number-average polymerization degree of from 1.6 to 3.6.

(8) A cellulose acylate film produced by a process as described in any of (1) to (7) above.

(9) The cellulose acylate film as described in (8) above, which has an in-plane retardation (Re) and a retardation in a thickness direction (Rth) satisfying numerical formulations (6) to (8):

$$Rth \geq Re \quad \text{numerical formula (6)}$$

$$300 \text{ nm} \geq Re \geq 0 \text{ nm} \quad \text{numerical formula (7)}$$

$$500 \text{ nm} \geq Rth \geq 0 \text{ nm}. \quad \text{numerical formula (8)}$$

(10) A cellulose acylate film produced by stretching a cellulose acylate film as described in (8) or (9) above in at least one direction with a draw ratio of from 1% to 500%.

(11) A retardation film comprising a cellulose acylate film as described in any of (8) to (10) above.

(12) A polarizing plate comprising:

a polarizing film; and two protective films sandwiching the polarizing film, wherein at least one of the two protective films is one of a cellulose acylate film as described in any of (8) to (10) above and a retardation film as described in (11) above.

(13) An optical compensatory film comprising:

an optically anisotropic layer formed by orienting a liquid crystalline compound on one of a cellulose acylate film as described in any of (8) to (10) above and a retardation film as described in (11) above.

(14) An antireflective film comprising:

an antireflective layer on one of a cellulose acylate film as described in any of (8) to (10) above and a retardation film as described in (11) above.

(15) An image display device comprising at least one of a cellulose acylate film as described in any of (8) to (10) above, a retardation film as described in (11) above, a polarizing plate as described in (12) above, an optical compensatory film as described in (13) above and an antireflective film as described in (14) above.

DETAILED DESCRIPTION OF THE INVENTION

<Cellulose Acylate Film>

[Cellulose Acylate]

The cellulose acylate to be used in the invention is characterized in that it has residual sulfate in an amount (in terms of sulfur atom) of from 0 to 500 ppm. The amount of residual sulfate is more preferably from 0 to 300 ppm, still more preferably from 0 to 200 ppm, particularly preferably from 0 to 100 ppm. Cellulose acylates having residual sulfate within this range can provide good heat stability. In order to adjust the amount of residual sulfate within the above-described range, optimization of acylation or partial hydrolysis (so-called ripening) of cellulose, neutralization and washing are conducted. These are described hereinafter.

Reasons why cellulose acylate having a residual sulfate in an amount of from 0 to 500 ppm shows good heat stability are not clarified in detail. It is surmised, however, that oxidation or decomposition of cellulose acylate takes place when heating is conducted in the presence of an excess amount of sulfate, leading to coloration.

The term "residual sulfate" as described herein means the total amount of sulfate existing in the cellulose acylate in the form of free sulfuric acid, salt, ester and complex thereof, with the amount being defined as the amount of contained sulfur atom. For example, 98 g of sulfuric acid is converted into 32 g of sulfur atom, thus the amount of sulfur atom being determined.

The amount of sulfate can be measured by an oxidative decomposition-coulometric titration method wherein a sample is thermally decomposed and combusted in an oxygen stream, sulfur dioxide thus produced is absorbed by an electrolytic solution within a titration cell, and coulometric titration is conducted using truiodide ion or an oxidative decomposition-ultraviolet fluorescence method or according to ASTM D-817-96.

Further, in the invention, it is preferred for the amount of residual metal (M1+M2) of cellulose acylate to satisfy the following numerical formula (4):

$$0 \text{ ppm} < M1+M2 < 1000 \text{ ppm} \quad \text{numerical formula (4)}$$

(wherein M1 represents a residual metal amount of an alkali metal, and M2 represents a residual metal amount of a group II metal).

M1+M2 more preferably satisfies 5 ppm<M1+M2<700 ppm, particularly preferably satisfied 10 ppm<M1+M2<400 ppm.

Examples of the alkali metal include lithium, sodium, potassium, rubidium and cesium. Lithium, sodium and potassium are preferred, with sodium and potassium being more preferred.

Examples of the group II metal include beryllium, magnesium, calcium, strontium and barium. Magnesium, calcium and strontium are preferred, with magnesium and calcium being more preferred.

The effect of the invention of improving heat stability of cellulose acylate by adjusting the amount of residual sulfate within a specific range can be more improved by adjusting the amount of these residual metals within the above-mentioned range. The amount and the kind of residual metals are controlled through the amount and the kind of compounds to be added as a neutralizing agent or a stabilizing agent, the amount of metals contained in water to be used (for example, the amount of metal ion contained as a trace component in water to be used for washing) and by treatments in the process (e.g., ripening, stabilization and washing).

The amounts of these metals in the cellulose acylate can be determined by ion chromatography, atomic extinction spectrum analysis, ICP analysis or ICP-MS analysis.

Also, in the invention, the metal/sulfur equivalent ratio of cellulose acylate given by the following numerical formula (5) is preferably from 0.25 to 3:

$$\text{metal/sulfur equivalent ratio}=((\text{amount of } M1 \text{ in terms of moles}/2)+\text{amount of } M2 \text{ in terms of moles})/\text{amount of } S \text{ in terms of moles} \quad \text{numerical ratio (5)}$$

(wherein M1 represents the amount of residual alkali metal, M2 represents the amount of residual group II metal, and S represents the amount of residual sulfate of the cellulose acylate (in terms of amount of sulfur atom).

The metal/sulfur equivalent ratio is more preferably from 0.5 to 2.5, particularly preferably from 0.75 to 2.0. When the metal/sulfur equivalent ratio is 0.25 or more, heat stability of the cellulose acylate is not deteriorated and, when the metal/sulfur equivalent ratio is 3 or less, there do not arise the problems of whitening of a resulting cellulose acylate film, deterioration of weatherability of a resulting film and a poor filming property, thus such ratio being preferred.

Also, as has been described hereinbefore, the cellulose acylate to be used in the invention is formed into a cellulose acylate film according to the melt-cast film production process, and is characterized by having an acyl substitution degree satisfying the following numerical formulae (1) to (3):

$2.0 \leq A+B \leq 3$   numerical formula (1)

$0 \leq A \leq 2.5$   numerical formula (2)

$0.3 \leq B \leq 3$   numerical formula (3)

(wherein A represents a substitution degree of acetyl group, and B represents sum of substitution degrees of acyl groups having 3 to 7 carbon atoms).

The glucose units constituting cellulose through β-1,4-glycoside bond have free hydroxyl groups at 2-, 3- and 6-positions. The cellulose acylate of the invention is a polymer obtained by esterifying part or all of the hydroxyl groups. The term "substitution degree" as used herein means the sum of the proportions of esterified hydroxyl groups at the 2-, 3- and 6-position of the repeating units. Specifically, when each of the hydroxyl groups at the 2-, 3- and 6-positions is 100% esterified, the substitution degree for each position is taken as 1. Thus, when all of the hydroxyl groups at the 2-, 3- and 6-positions are 100% esterified, the substitution degree becomes the maximum of 3.

Of the acyl groups having 3 to 7 carbon atoms, which are the objects of substitution degree B, propionyl, butyryl, 2-methylpropionyl, pentanoyl, 3-methylbutyryl, 2-methylbutyryl, 2,2-dimethylpropionyl (pivaloyl), hexanoyl, 2-methylpentanoyl, 3-methylpentanoyl, 4-methylpentanoyl, 2,2-dimethylbutyryl, 2,3-dimethylbutyryl, 3,3-dimethylbutyryl, cyclopentanecarbonyl, heptanoyl, cyclohexanecarbonyl and benzoyl are preferred. More preferred are propionyl, butyryl, pentanoyl, hexanoyl and benzoyl, and still more preferred are propionyl and butyryl, with propionyl being particularly preferred.

The cellulose acylate of the invention is characterized in that, as is shown by the foregoing numerical formula (1), A+B is in the range of from 2.0 to 3, preferably from 2.5 to 3, more preferably from 2.6 to 2.99, particularly preferably from 2.7 to 2.97.

In case where A+B is smaller than 2.0, hydrophilicity of the cellulose acylate increases so much that moisture permeability of the resulting film becomes large, thus such A+B not being preferred.

The cellulose acylate of the invention is characterized in that, as is shown by the foregoing numerical formula (2), A is in the range of from 0 to 2.5, preferably from 0.1 to 2.1, more preferably from 0.15 to 2.0, still more preferably from 0.2 to 1.9, particularly preferably from 0.25 to 1.7.

In case where A exceeds 2.5, the glass transition temperature and melting temperature of the film become so high that it becomes difficult to conduct the melt-cast film production process.

The cellulose acylate of the invention is characterized in that, as is shown by the foregoing numerical formula (3), B is in the range of from 0.3 to 3, preferably from 0.7 to 2.9, more preferably from 0.85 to 2.85, still more preferably from 0.9 to 2.8, particularly preferably from 1.0 to 2.75.

In case where B is less than 0.3, the glass transition temperature and melting temperature of the film become so high that it becomes difficult to conduct the melt-cast film production process.

The invention provides a cellulose acylate film having a high transparency and being adapted for an optical film, which has both good heat stability and good adaptability for the melt-cast film production process and which does not suffer coloration in the melt-cast film production process to produce a cellulose acylate film, by adjusting so that the above-mentioned numerical formulae (1) to (3) are satisfied and that the amount of residual sulfate falls within a particular range.

Next, the process of the invention for producing the cellulose acylate is described in detail below.

As to starting cotton and process for synthesizing cellulose acylate of the invention, reference can be made to descriptions of Hatsumei Kyokai Kokai Giho (Kogi Bango 2001-1745, published on Mar. 15, 2001 by Hatsumei Kyokai), pp. 7-12.

(Starting Material and Pre-treatment)

As starting materials for cellulose, those from hardwood pulp, softwood pulp and cotton flower linter are preferably used. As starting materials for cellulose, highly pure materials containing c-cellulose in a content of from 92% by weight to 99.9% by weight are preferably used.

In the case where the starting material for cellulose is in a form of sheet or mass, it is preferred to previously break it preferably to a degree where the form of cellulose becomes cotton-like or fluff-like.

(Activation)

It is preferred to subject the material for cellulose to the treatment (activation) of contacting with an activating agent prior to acylation. As the activating agent, a carboxylic acid or water can be used. In the case of using water, it is preferred to include a step of adding an excess acid anhydride after the activation to conduct dehydration, a step of washing with a carboxylic acid to replace water or a step of adjusting conditions for acylation. The activating agent may be added at any adjusted temperature and, as a method for adding it, a proper one can be selected from among, for example, a spraying method, a dropwise adding method and a dipping method.

Carboxylic acids preferred as the activating agents are carboxylic acids having 2 to 7 carbon atoms (e.g., acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid). More preferred are acetic acid, propionic acid and butyric acid, and particularly preferred is acetic acid.

In activation, it is possible to add, as needed, a catalyst for acylation, such as sulfuric acid. However, addition of a strong acid such as sulfuric acid can accelerate depolymerization. Therefore, the addition amount thereof is preferably limited to a level of about 0.1% by weight to 10% by weight based on the weight of cellulose. Also, it may be possible to use two or more kinds of the activating agents in combination or to add an acid anhydride of carboxylic acid having 2 to 7 carbon atoms.

The addition amount of the activating agent is preferably 5% by weight or more, more preferably 10% by weight or more, particularly preferably 30% by weight or more, based on the weight of cellulose. When the amount of the added activating agent is equal to or more than the lower limit, there does not arise such problem as reduction of the degree of activation of cellulose, thus such amount being preferred. As to the upper limit of the addition amount of the activating agent, there is no particular limit as long as productivity is not reduced. However, the addition amount is preferably equal to or less than a 100-fold amount by weight, more preferably equal to or less than a 20-fold amount by weight, particularly preferably equal to or less than a 10-fold amount by weight, based on the weight of cellulose. It is also possible to conduct activation by adding a large excess of the activating agent and, thereafter, conduct such procedure as filtration, air drying, heat-drying, distillation under reduced pressure or substitution by a solvent to reduce the amount of the activating agent.

The activation time is preferably 20 minutes or longer. As to the upper limit, there is no particular limit as long as no detrimental influences are exerted on productivity, and the activation time is preferably 72 hours or shorter, more preferably 24 hours or shorter, particularly preferably 12 hours or shorter. Also, the activation temperature is preferably from 0° C. to 90° C., more preferably from 15° C. to 80° C., particularly preferably from 20° C. to 60° C. The step of activating cellulose may be conducted under pressure or under reduced pressure. As a heating means, electromagnetic waves such as microwave and infrared rays may be employed.

(Acylation)

In the process for producing cellulose acylate to be used in the invention, it is preferred to acylate hydroxyl groups of cellulose by reacting a carboxylic anhydride as the acylating agent with cellulose using a Brϕnsted acid or a Lewis acid as the catalyst.

As to synthesis for cellulose acylate having a large substitution degree at the 6-position, descriptions are given in official gazettes such as JP-A-11-5851, JP-A-2002-212338 and JP-A-2002-338601.

As other processes for synthesizing a cellulose acylate, there may be employed a process of reacting cellulose with a carboxylic anhydride or a carboxylic acid halide in the presence of a base (e.g., sodium hydroxide, potassium hydroxide, barium hydroxide, sodium carbonate, pyridine, triethylamine, potassium t-butoxide, sodium methoxide or sodium ethoxide) or a process of using as the acylating agent a mixed acid anhydride (e.g., carboxylic acid-trifluoroacetic acid mixed acid anhydride or carboxylic acid-methanesulfonic acid mixed acid anhydride). In particular, the latter process is effective for introducing an acyl group having a large number of carbon atoms or introducing an acyl group which is difficult to introduce by the acylating process using a carboxylic anhydride-acetic acid-sulfuric acid catalyst.

As a process for obtaining a cellulose mixed acylate, there may be employed, for example, a process of reacting as the acylating agent two kinds of carboxylic anhydrides by using a mixture thereof or by successively adding them, a process of using a mixed acid anhydride prepared from two kinds of carboxylic acids (e.g., acetic-propionic mixed acid anhydride), a process of synthesizing a mixed acid anhydride (e.g., acetic-propionic anhydride) within the reaction system using a carboxylic acid and an acid anhydride of other carboxylic acid (for example, acetic and propionic anhydride) and reacting the mixed acid anhydride with cellulose, and a process of once synthesizing a cellulose acylate having the substitution degree less than 3 and further acylating remaining hydroxyl groups with an acid anhydride or an acid halide.

(Acid Anhydride)

The carboxylic anhydride has preferably 2 to 7 carbon atoms in the carboxylic acid moiety, and examples thereof include acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexsanecarboxylic anhydride and benzoic anhydride.

More preferred examples include anhydrides such as acetic anhydride, propionic anhydride, butyric anhydride, valeric anhydride, hexanoic anhydride and heptanoic anhydride, with acetic anhydride, propionic anhydride and butyric anhydride being particularly preferred.

It is preferably conducted to use these acid anhydrides in combination thereof for the purpose of preparing a mixed ester. The mixing ratio is preferably determined depending upon the substitution ratio of an intended mixed ester. The acid anhydride is usually added in an amount more than the equivalent amount with respect to cellulose. That is, the acid anhydride is added in an amount of preferably from 1.2 to 50 equivalents, more preferably from 1.5 to 30 equivalents, particularly preferably from 2 to 10 equivalents, with respect to the hydroxyl group of cellulose.

(Catalyst)

As the catalyst for acylation to be used in the invention in the production of the cellulose acylate, a Brϕnsted acid or a Lewis acid is preferably used. Definition of the Brϕnsted acid and the Lewis acid is described in, for example, Rikagaku Jiten, 5$^{th}$ ed. (2000). Preferred examples of the Brϕnsted acid include sulfuric acid, perchloric acid, phosphoric acid, methanesulfonic acid, benzenesulfonic acid and p-toluenesulfonic acid. Preferred examples of the Lewis acid include zinc chloride, tin chloride, antimony chloride and magnesium chloride.

As the catalyst, sulfuric acid or perchloric acid is more preferred, with sulfuric acid being particularly preferred. The preferred addition amount of the catalyst is from 0.1 to 30% by weight, more preferably from 1 to 15% by weight, particularly preferably from 3 to 12% by weight, based on the weight of cellulose.

(Solvent)

Upon conducting acylation, a solvent may be added for the purpose of adjusting viscosity, reaction rate, stirring properties and acyl substitution ratio. As such solvent, dichloromethane, chloroform, carboxylic acid, acetone, ethyl methyl ketone, toluene, dimethylsulfoxide and sulfolane may be used. Of these, carboxylic acid is preferred. Examples thereof include carboxylic acids having 2 to 7 carbon atoms (e.g., acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid and cyclopentanecarboxylic acid). More preferred examples thereof include acetic acid, propionic acid and butyric acid. These solvents may be used in combination thereof. In the case of using the carboxylic acids as a mixture thereof, the acyl composition may be the same as, or different from, that of the anhydride.

(Conditions for Acylation)

Upon conducting acylation, the acid anhydride and the catalyst and, as needed, the solvent may be mixed with each other, followed by mixing the resulting mixture with cellulose or, alternatively, these may separately and successively be mixed with cellulose. However, it is usually preferred that a mixture of the acid anhydride and the catalyst or a mixture of the acid anhydride, the catalyst and the solvent is prepared as an acylating agent before reaction with cellulose. In order to depress an increase in temperature inside a reaction vessel due to heat of acylation reaction, it is preferred to previously cool the acylating agent. As the cooling temperature, a temperature of from −50° C. to 20° C. is preferred, a temperature of from −35° C. to 10° C. is more preferred, and a temperature of from −25° C. to 5° C. is particularly preferred. The acylating agent may be added in a liquid form or in a crystal-like, flake-like or block-like solid form by freezing it.

Further, the acylating agent may be added to cellulose at a time or by portions. Also, cellulose may be added to the acylating agent at a time or by portions. In the case of adding the acylating agent by portions, the portions may have the same composition, or may have plural, different compositions. Preferred examples thereof include: 1) to first add a mixture of the acid anhydride and the solvent, then add the catalyst; 2) to first add a mixture of the acid anhydride, the solvent and part of the catalyst, then add a mixture of the rest of the catalyst and the solvent; 3) to first add a mixture of the acid anhydride and the solvent, then add a mixture of the catalyst and the solvent; and 4) to first add the solvent, then add a mixture of the acid anhydride and the catalyst or a mixture of the acid anhydride, the catalyst and the solvent.

The acylation reaction of cellulose is an exothermic reaction. In the process for producing the cellulose acylate of the invention, the highest temperature reached upon acylation is preferably 50° C. or less. When the reaction temperature is equal to or less than this temperature, there does not arise such problem as that depolymerization proceeds so much that production of a cellulose acylate having a polymerization degree suited for the use of the invention becomes difficult, thus such temperature range being preferred. The highest temperature reached in the acylation is preferably 45° C. or less, more preferably 40° C. or less, particularly preferably 35° C. or less. The reaction temperature may be controlled by using a temperature-controlling device or through the initial temperature of the acylating agent. It is possible to reduce the pressure within the reaction vessel to control the reaction temperature through heat of gasification of liquid components in the reaction system. Since the amount of heat generated upon acylation in the initial stage of the reaction is larger than in the subsequent stage, it is possible to cool in the initial stage of the reaction and then heat the reaction system in the subsequent stage for controlling the reaction temperature. The end point of the acylation can be found through transmittance of light, viscosity of the solution, change in temperature of the reaction system, solubility of the reaction product in an organic solvent, or by such means as observation under a polarizing microscope.

The lowest temperature of the reaction is preferably −50° C. or more, more preferably −30° C. or more, particularly preferably −20° C. or more. The acylation time is preferably from 0.5 hour to 24 hours, more preferably from 1 hour to 12 hours, particularly preferably from 1.5 hours to 6 hours. In case where the acylation time is shorter than 0.5 hour, the reaction does not sufficiently proceed under ordinary reaction conditions whereas, in case where it exceeds 24 hours, such a long reaction time is not favorable for industrial production.

(Reaction-stopping Agent)

In the process for producing the cellulose acylate to be used in the invention, it is preferred to add a reaction-stopping agent after the acylation reaction.

As the reaction-stopping agent, any one that can decompose an acid anhydride may be used. Preferred examples thereof include water, alcohol (e.g., ethanol, methanol, propanol or isopropyl alcohol) and a composition containing them. Also, the reaction-stopping agent may include a neutralizing agent to be described hereinafter. Upon addition of the reaction-stopping agent, it is better to add a mixture of a carboxylic acid such as acetic acid, propionic acid or butyric acid and water than to directly add water or alcohol in order to avoid such troubles as that heat is generated in an amount exceeding the cooling ability of the reaction apparatus to cause reduction of the polymerization degree of cellulose acylate and that cellulose is precipitated in an undesired form. As the carboxylic acid, acetic acid is particularly preferred. The carboxylic acid and water may be used in any proportion, but the content of water is preferably from 5% by weight to 80% by weight, more preferably from 10% by weight to 60% by weight, particularly preferably from 15% by weight to 50% by weight.

The reaction-stopping agent may be added to the reaction vessel for acylation, or the reaction product may be added to a vessel containing the reaction-stopping agent. Upon addition of the reaction-stopping agent, the reaction vessel may or may not be cooled but, for the purpose of depressing depolymerization, it is preferred to cool the reaction vessel to thereby depress an increase in temperature. It is also preferred to previously cool the reaction-stopping agent.

(Neutralizing Agent)

During or after the step of stopping acylation reaction, a neutralizing agent or a solution thereof may be added in order to hydrolyze excess carboxylic anhydride remaining in the reaction system, neutralize part or whole of the carboxylic acid and the esterification catalyst or to adjust the mount of residual sulfate and the amount of residual metal.

Preferred examples of the neutralizing agent include ammonium, an organic quaternary ammonium (e.g., tetramethylammonium, tetraethylammonium, tetrabutylammonium or diisopropyldiethylammonium), carbonates, hydrogencarbonates, organic acid salts (e.g., acetates, propionates, butyrates, benzoates, phthalates, hydrogenphahtlates, citrates and tartrates), hydroxides and oxides of an alkali metal (preferably, lithium, sodium, potassium, rubidium or cesium, more preferably lithium, sodium or potassium, particularly preferably sodium or potassium), a group II metal (preferably beryllium, calcium, magnesium, strontium or barium, particularly preferably calcium or magnesium), a group III to XII group metal (e.g., iron, chromium, nickel, copper, lead, zinc, molybdenum, niobium or titanium) or a group XIII to XV element (e.g., aluminum, tin or antimony). These neutralizing agents may be used as a mixture or may be in a mixed salt form (e.g., magnesium acetate propionate or potassium sodium tartrate).

More preferred neutralizing agents are carbonates, hydrogencarbonates, organic acid salts, hydroxides or oxides of an alkali metal or a group II metal, and particularly preferred neutralizing agents are carbonates, hydrogencarbonates, acetates or hydroxides of sodium, potassium, magnesium or potassium.

Examples of the solvent for the neutralizing agent include water, an alcohol (e.g., ethanol, methanol, propanol or isopropanol), an organic acid (e.g., acetic acid, propionic acid or butyric acid), a ketone (e.g., acetone or ethyl methyl ketone), a polar solvent such as dimethylsulfoxide, and a mixed solvent thereof.

(Partial Hydrolysis)

The thus-obtained cellulose acylate has a total substitution degree of nearly 3 and, for the purpose of obtaining cellulose acylate having a desired substitution degree, it is generally conducted to maintain the obtained cellulose acylate at 20 to 90° C. for several minutes to several days in the presence of a small amount of a catalyst (generally, residual acylating catalyst such as sulfuric acid) and water to thereby partially hydrolyze the ester bond and reduce the acyl substitution degree of the cellulose acylate to a desired level (so-called ripening). Since sulfuric acid ester of cellulose is also hydrolyzed in the course of the partial hydrolysis, the amount of sulfuric acid ester bound to cellulose can be decreased by adjusting the hydrolyzing conditions.

(Discontinuation of Partial Hydrolysis)

It is preferred to completely neutralize, at the stage where a desired cellulose acylate is obtained, the catalyst remaining in the reaction system by using the aforesaid neutralizing agent or the salt thereof to thereby stop the partial hydrolysis. It is also preferred to add a neutralizing agent which generates a salt having a low solubility for the reaction solution (e.g., magnesium carbonate or magnesium acetate) to thereby effectively remove the catalyst (e.g., sulfuric acid ester) in the solution or in a form bound to cellulose. It is also useful for the purpose of removing sulfuric acid ester to maintain, after discontinuation of the partial hydrolysis, the reaction solution at 20 to 90° C. for several minutes to several days.

(Filtration)

For the purpose of removing or reducing unreacted materials, slightly soluble salts and other foreign matters in the resultant cellulose acylate, it is preferred to conduct filtration of the reaction mixture (dope). The filtration may be conducted in any step between completion of acylation and re-precipitation. It is also preferred to dilute with a proper solvent prior to filtration for the purpose of controlling filtration pressure and handling properties.

(Re-precipitation)

Cellulose acylate can be re-precipitated from the thus-obtained cellulose acylate solution by mixing it into a poor solvent such as water or an aqueous solution of a carboxylic acid (e.g., acetic acid or propionic acid) or by mixing a poor solvent into the cellulose acylate solution, followed by washing and stabilizing treatment to obtain an intended cellulose acylate. The re-precipitation may be conducted continuously or batchwise with each batch treating a definite amount. It is also preferred to control form, molecular weight distribution and bulk density of the re-precipitated cellulose acylate by adjusting concentration of the cellulose acylate solution and composition of the poor solvent depending upon substitution state or polymerization degree of the cellulose acylate.

Also, for the purpose of improving purification efficiency and adjusting molecular weight distribution and bulk density of cellulose acylate, a procedure of again dissolving the once re-precipitated cellulose acylate in its good solvent (e.g., acetic acid or acetone) and acting thereon a poor solvent (e.g., water) to conduct re-precipitation may be conducted, as needed, once or plural times.

(Washing)

The resultant cellulose acylate is preferably subjected to a washing treatment. As a washing solvent, any solvent may be used that scarcely dissolves cellulose acylate and can remove impurities. Usually, however, water or warm water is used. The temperature of the washing water is preferably from 25° C. to 100° C., more preferably from 30° C. to 90° C., particularly preferably from 40° C. to 80° C. The washing treatment may be conducted according to a so-called batch system wherein filtration and exchange of the washing solution are repeated or by using a continuously washing apparatus. It is also preferred to re-use waste liquor generated in the step of re-precipitation and the washing step as the poor solvent in the re-precipitating step, or to recover the solvent such as carboxylic acid by means of, for example, distillation to re-use it.

Progress of the washing may be traced by any means. Preferred examples of the means include hydrogen ion concentration, ion chromatography, electric conductivity, ICP, elemental analysis and atomic extinction spectrum.

Such treatment can remove the catalyst (e.g., sulfuric acid, perchloric acid, trifluoroacetic acid, p-toluenesulfonic acid, methanesulfonic acid or zinc chloride), the neutralizing agent (e.g., carbonate, acetate, hydroxide or oxide of calcium, magnesium, iron, aluminum or zinc), a reaction product between the neutralizing agent and the catalyst, carboxylic acid (e.g., acetic acid, propionic acid or butyric acid) and a reaction product between the neutralizing agent and carboxylic acid. This is effective for enhancing stability of the resulting cellulose acylate.

(Stabilization)

The washed cellulose acylate is preferably treated with a stabilizing agent or an aqueous solution thereof in order to more improve stability or reduce the smell of carboxylic acid.

As the stabilizing agent, there are illustrated weakly alkaline substances, and carbonates, hydrogencarbonates, hydroxides and oxides of sodium, potassium, calcium, magnesium and aluminum are preferred.

The amount of residual impurities can be controlled by selecting the amount of washing solution, the washing temperature and washing period, the stirring method, the shape of washing vessel, and the composition and concentration of the stabilizing agent. In the invention, acylating condition, partially hydrolyzing condition, neutralizing condition and washing condition are set so that the amount of the residual sulfate (in terms of amount of sulfur atom) becomes 0 to 500 ppm. M1 (amount of the residual alkali metal) and M2 (amount of the residual group II metal) can also be controlled by selecting the partially hydrolyzing condition, the neutralizing condition and the washing condition.

(Drying)

In order to adjust the water content of the resultant cellulose acylate to a preferred level, it is preferred to dry the cellulose acylate. The drying method is not particularly limited as long as an intended water content can be obtained. However, it is preferred to effectively conduct drying by employing heating, blast, pressure reduction and stirring independently or in combination. The drying temperature is preferably from 0 to 200° C., more preferably from 40 to 180° C., particularly preferably from 50 to 160° C. The cellulose acylate of the invention has a water content of preferably 2% by weight or less, more preferably 1% by weight or less, particularly preferably 0.7% by weight or less.

(Shape)

The cellulose acylate of the invention can take various forms such as particles, powders, fibers or masses. However, as a starting material for producing a film, a particulate form or a powdery form is preferred. Therefore, the dried cellulose acylate may be pulverized or sieved in order to unify the particle size or improve handling properties. When cellulose acylate in a particulate form, 90% by weight or more of the particles to be used have a particle size of preferably from 0.5 to 5 mm, and 50% by weight or more of the particles to be used have a particle size of preferably from 1 to 4 mm. The cellulose acylate particles preferably have a shape as spherical as possible. Also, the cellulose acylate of the invention has a bulk density of preferably from 0.5 to 1.3, more preferably from 0.7 to 1.2, particularly preferably from 0.8 to 1.15. Method for measuring the bulk density is specified in JIS K-7365. The bulk density can be controlled under the re-precipitation condition as described hereinbefore. The cellulose acylate particles of the invention have an angle of repose of preferably from 10 to 70 degrees, more preferably from 15 to 60 degrees, particularly preferably from 20 to 50 degrees.

(Polymerization Degree)

The cellulose acylate to be used in the invention has a polymerization degree of preferably from 100 to 700, more preferably from 120 to 600, particularly preferably from 130 to 450, in terms of viscosity-average polymerization degree. The average polymerization degree can be measured according to, for example, the limiting viscosity method of Uda et al. (Kazuo Uda & Hideo Saito; Sen-i Gakkai Shi, vol. 18, No. 1, pp. 105-120, 1962) or the molecular weight distribution-measuring method by gel permeation chromatography (GPC).

In the invention, the cellulose acylate has the weight-average polymerization degree/number-average polymerization degree of preferably from 2.0 to 6.0, more preferably from 2.3 to 5.5, still more preferably from 2.4 to 4.5. The weight-average polymerization degree and the number-average polymerization degree can be obtained by, for example, the GPC method. The weight-average polymerization degree and the number-average polymerization degree (molecular weight distribution) can be controlled under the re-precipitation condition.

[Composition Containing at Least Cellulose Acylate]

In the invention, a cellulose acylate film is produced by melt-cast filming a composition containing at least the cellulose acylate. The composition is described below.

In the invention, cellulose acylates may be used independently or as a mixture of two or more thereof as long as they have the acyl substitution degrees satisfying the foregoing numerical formulae (1) to (3). It is also possible to mix a cellulose acylate having the acyl substitution degree not satisfying the foregoing numerical formulae (1) to (3), and a high polymer component other than the cellulose acylate of the invention may properly be mixed. In the case of using the cellulose acylates as a mixture, the content of the cellulose acylate of the invention is preferably from 50% by weight to 100% by weight, more preferably from 60% by weight to 100% by weight, particularly preferably from 70% by weight to 100% by weight, based on the weight of the whole cellulose acylates. The high molecular component to be mixed with cellulose acylate preferably has an excellent compatibility with cellulose acylate and, when formed into a film, provides a transmittance of 80% or more, more preferably 90% or more, particularly preferably 92% or more.

<Plasticizer>

It is preferred to reduce the crystal-melting temperature (Tm) of the cellulose acylate by adding a plasticizer. The plasticizer to be used in the invention is not particularly limited as to its molecular weight, and either of a low molecular weight compound and a high molecular weight compound may be used. Examples of the plasticizer include phosphates, alkylphthalylalkyl glycolates, carboxylates and fatty acid esters of polyhydric alcohols. The plasticizer may be solid or liquid, i.e., it is not particularly limited as to its melting point and boiling point. In the case of conducting melt-cast film production, plasticizers having a low volatility can particularly preferably be used.

Specific examples of phosphates include triphenyl phosphate, tributyl phosphate, tributoxyethyl phosphate, tricresyl phosphate, trioctyl phosphate, trinaphthyl phosphate, trixylyl phosphate, tris-o-biphenyl phosphate, cresylphenyl phosphate, octyldiphenyl phosphate, biphenyldiphenyl phosphate, and 1,4-phenylene-tetraphenyl phosphate. It is also preferred to use the phosphate series plasticizers described in JP-T-6-501040 (the term "JP-T" as used herein means a published Japanese translation of a PCT patent application), claims 3 to 7.

Examples of alkylphthalylalkyl glycolates include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

Examples of carboxylate include phthalates such as dimethyl phthalate, diethyl phthalate, dibutyl phthalate, dioctyl phthalate and diethylhexyl phthalate; citrates such as acetyl trimethyl citrate, acetyl triethyl citrate and acetyl tributyl citrate; adipates such as dimethyl adipate, dibutyl adipate, diisopropyl adipate, di(2-ethylhexyl)adipate, diisodecyl adipate and bis(butyldiglycol adipate); aromatic polycarboxylic acid esters such as tetraoctyl pyromellitate and trioctyl trimellitate; aliphatic polycarboxylic acid esters such as dibutyl sebacate, dioctyl sebacate, diethyl azelate, dibutyl azelate and dioctyl azelate; and fatty acid esters of polyhydric alcohols such as glycerin triacetate, diglycerin tetraacetate, acetylated glyceride, monoglyceride and diglyceride. Further, it is preferred to use butyl oleate, methyl acetyl ricinoleate, dibutyl sebacate and triacetin independently or in combination thereof.

Also, there are illustrated high molecular plasticizers such as aliphatic polyesters comprising glycol and dibasic acid (e.g., polyethylene adipate, polybutylene adipate, polyethylene succinate and polybutylene succinate), aliphatic polyesters comprising hydroxycarboxylic acid (e.g., polylactic acid and polyglycollic acid), aliphatic polyesters comprising lactone (e.g., polycaprolactone, polypropiolactone and polyvalerolactone) and vinyl polymers (e.g., polyvinylpyrrolidone). As the plasticizer, these may be used independently or in combination with the low molecular plasticizers.

The polyhydric alcohol-based plasticizers include glycerin-based ester compounds such as glycerin ester and diglycerin ester, polyalkylene glycols such as polyethylene glycol and polypropylene glycol, and compounds wherein an acyl group is bound to the hydroxyl group of polyalkylene glycol, which have a good compatibility with cellulose fatty acid ester and exhibit a remarkable thermoplastic effect.

Specific examples of the glycerin ester include glycerin diacetate stearate, glycerin diacetate palmitate, glycerin diacetate myristate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate myristate, glycerin dipropionate palmitate, glycerin dipropionate stearate, glycerin dipropionate oleate, glycerin trigutyrate, glycerin tripentanoate, glycerin monopalmitate, glycerin monostearate, glycerine distearate, glycerin propionate laurate and glycerin oleate propionate. However, these are not limitative and may be used independently or in combination thereof.

Of these, glycerin diacetate caprylate, glycerin diacetate pelargonate, glycerin diacetate caprate, glycerin diacetate laurate, glycerin diacetate myristate, glycerin diacetate palmitate, glycerin diacetate stearate and glycerin diacetate oleate are preferred.

Specific examples of the diglycerin esters include diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramyristate, diglycerin tetrapalmitate, mixed acid esters of diglycerin such as diglycerin-triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate myristate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimyristate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprate, diglycerin acetate tripelargonate, diglycerin acetate tricaprate, diglycerin acetate trilaurate, diglycerin acetate trimyristate, diglycerin acetate tripalmitate, diglycerin acetate tristearate and diglycerin acetate trioleate, diglycerin laurate, diglycerin stearate, diglycerin caprylate, diglycerin myristate and diglycerin oleate. However, these are not limitative, and may be used independently or in combination thereof.

Of these, diglycerin tetraacetate, diglycerin tetrapropionate, diglycerin tetrabutyrate, diglycerin tetracaprylate and diglycerin tetralaurate are preferred.

Specific examples of the polyalkylene glycols include polyethylene glycol and polypropylene glycol having an average molecular weight of from 200 to 1,000 which, however, are not limitative at all and may be used independently or in combination thereof.

Specific examples of the compounds wherein an acyl group is bound to the hydroxyl group of polyalkylene glycol include polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristate, polyoxypropylene palmitate, polyoxypropylene stearate, polyoxypropylene oleate and polyoxypropylene linoleate which, however, are not limitative and may be used independently or in combination thereof.

The addition amount of the plasticizer is preferably from 0 to 20% by weight, more preferably from 2 to 18% by weight, most preferably from 4 to 15% by weight.

In case where the content of the plasticizer exceeds 20% by weight, the plasticizer oozes out on the surface of the film formed by melt-cast film production and the glass transition temperature Tg, which shows heat resistance, is decreased, though thermal flowability of the cellulose acylate becomes good.

<Stabilizer>

In the invention, phosphite-based compounds, phosphorous acid ester compounds, phosphates, thiophosphates, weak organic acids and epoxy compounds may be added as stabilizers for preventing thermal deterioration or preventing coloration within a range of not spoiling the required performances of the film. As the phosphite-based stabilizers, those compounds can preferably be used which are described in JP-A-2004-182979, paragraphs [0023] to [0039]. As the specific examples of the phosphorous acid ester compounds, those compounds can be used which are described in JP-A-51-70316, JP-A-10-306175, JP-A-57-78431, JP-A-54-157159 and JP-A-55-13765.

The addition amount of the stabilizer in the invention is preferably from 0.005 to 0.5% by weight, more preferably from 0.01 to 0.4% by weight, particularly preferably from 0.05 to 0.3% by weight, based on the weight of cellulose acylate. In case where the addition amount is less than 0.005% by weight, there results in some cases insufficient effect of preventing deterioration and coloration upon melt-cast film production, thus such amount not being preferred. On the other hand, in case where the addition amount is more than 0.5% by weight, the plasticizer can ooze out on the surface of the cellulose acylate film formed by melt-cast film production, thus such amount not being preferred.

Also, it is preferred to add a deterioration-preventing agent and an antioxidant. When added as deterioration-preventing agents or antioxidants, phenolic compounds, thioether-based compounds and phosphorus-containing compounds provide synergistic effects of preventing deterioration and oxidation. As further stabilizers, materials described in detail in Hatsumei Kyokai Kokai Giho (Kogi Bango 2001-1745, published by Hatsumei Kyokai on Mar. 15, 2001), pp. 17-22 can preferably be used.

<UV Ray Absorbent>

Next, one or more kinds of UV ray absorbents may be incorporated in the cellulose acylate of the invention. As the UV ray absorbents, those compounds are preferred which have a large absorbance for light of 380 nm or shorter in wavelength in view of preventing deterioration of crystals and which have a small absorbance for light of 400 nm or longer in wavelength in view of image display properties. Preferred examples of the compounds include hydroxybenzophenone-based compounds, benzotriazole-based compounds, salicylate-based compounds, benzophenone-based compounds, cyanoacrylate-based compounds and nickel complex-based compounds. More preferred UV ray absorbents are benzotriazole-based compounds and benzophenone-based compounds. Benzotriazole-based compounds are particularly preferred because they cause less coloration unnecessary for cellulose acylate.

Preferred UV ray absorbents include 2,6-di-tert-butyl-p-cresol, pentaerythrityl-tetrakis [3-(3,5-di-tert-butyl-4-hydroxyphenyl)propionate], triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl)propionate], octadecyl-3-(3, 5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene and tris-(3,5-di-tert-butyl-4-hydroxybenzyl)-isocyanurate.

Further, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2-(2H-benzotriazol-2-yl)-6-(straight chain and side chain dodecyl)-4-methylphenol, a mixture of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate and, as UV ray absorbents, high molecular UV ray absorbents and polymer type UV ray absorbents described in JP-A-6-148430 may preferably be used.

Of these, 2,6-di-tert-butyl-p-cresol, pentaerythrityl-tetrakis[3-(3,5-di-tert-butyl-4-hydroxyphenyl)propionate] and triethylene glycol-bis[3-(3-tert-butyl-5-methyl-4-hydroxyphenyl)propionate] are preferred. Also, hydrazine-based metal-inactivating agents such as N,N'-bis[3-(3,5-di-tert-butyl-4-hydroxyphenyl)propionyl]hydrazine and phosphorus-containing processing-stabilizing agents such as tris(2,4-di-tert-butylphenyl)phosphite may be used together with the UV ray absorbent. The addition amounts of these compounds are preferably from 1 ppm to 3.0% by weight, more preferably from 10 ppm to 2% by weight.

In addition to the above-mentioned compounds, various additives (e.g., a deterioration-preventing agent, an optical anisotropy-controlling agent, fine particles, an IR absorbent, a surfactant and a smell-trapping agent (e.g., amines) can be added. The IR absorbent to be used is exemplified by those which are described in JP-A-2001-194522, and the UV ray absorbent to be used is exemplified by those which are described in JP-A-2001-151901. They are preferably incorporated in an amount of from 0.001% by weight to 5% by weight based on the weight of cellulose acylate.

As the fine particles, those which have an average particle size of from 5 to 3,000nm are preferably used, and those which comprise a metal oxide or a cross-linked polymer may be used. They are incorporated in an amount of preferably from 0.001% by weight to 5% by weight based on the weight of cellulose acylate. The deterioration-preventing agent is incorporated in an amount of preferably from 0.0001% by weight to 2% by weight based on the weight of cellulose acylate. As the optical anisotropy-controlling agent, those which are described in, for example, JP-A-2003-66230 and JP-A-2002-49128 can be used in an amount of preferably from 0.1% by weight to 15% by weight based on the weight of cellulose acylate.

[Process for Producing a Cellulose Acylate Film by Melt-cast Film Production]

The cellulose acylate film of the invention can be produced by a melt-cast film production process.

The melt-cast film production process is specifically described below.

[1] Drying

The cellulose acylate film of the invention can be produced by melt-cast filming a composition prepared by adding the plasticizers and the like to the afore-mentioned cellulose acylate. Preferably, the composition is palletized prior to melt-cast film production into a cellulose acylate film of the invention. The water content of such pellets is adjusted to preferably 1% by weight or less, more preferably 0.5% by weight or less, prior to melt-cast film production. After adjusting the water content, the pellets are thrown into a hopper of a melt extrusion machine. In this occasion, the temperature of the hopper is adjusted preferably to a temperature higher than a temperature lower than Tg of the cellulose acylate by 50° C. and higher than Tg by 30° C. (hereinafter merely referred to as "from Tg−50° C. to Tg+30° C."), more preferably to a temperature of from Tg−40° C. to Tg+10° C., particularly preferably to a temperature of from Tg−30° C. to Tg. Thus, re-adsorption of moisture within the hopper can be depressed, and efficiency of the above-described drying can be more ensured.

[2] Knead Extrusion

Knead-melting is conducted at a temperature of from 120° C. to 250° C., more preferably from 140° C. to 220° C., particularly preferably from 150° C. to 200° C. In this occasion, the melting temperature may be at a definite level, or may be controlled by dividing into several levels. The kneading time is preferably from 2 minutes to 60 minutes, more preferably from 3 minutes to 40 minutes, particularly preferably from 4 minutes to 30 minutes. Further, it is also preferred to conduct knead-melting while evacuating the inside of the melt extrusion machine in an inert stream (e.g., nitrogen) or by using an extruder equipped with a vent.

[3] Filming

The molten resin is introduced into a gear pump and, after removing pulsation of the extruder, filtered through a metal-mesh filter, then extruded in a sheet form onto a cooling drum through a T-shaped die installed after the filter. The extrusion may be conducted in a single layer or in plural layers using a multi-manifold die or a feedblock die. In this occasion, unevenness in thickness in the transverse direction can be avoided by adjusting the opening of the die lip.

Then, the molten resin is extruded onto a casting drum. In this occasion, it is preferred to enhance close contact between the casting drum and the melt-extruded sheet by using a method of applying static electricity, an air knife method, an air chamber method, a vacuum nozzle method or a touch roll method. Such method for improving close contact may be applied to all over the surface of the melt-extruded sheet or to part thereof.

The temperature of the casting drum is preferably from 60° C. to 160° C., more preferably from 70° C. to 150° C., particularly preferably from 80° C. to 150° C. Thereafter, the extruded film is stripped off from the casting drum, introduced between nip rolls, and then taken up. The take-up rate is preferably from 10 m/min to 100 m/min, more preferably from 15 m/min to 80 m/min, particularly preferably from 20 m/min to 70 m/min.

The filming width is preferably from 1 m to 5 m, more preferably from 1.2 m to 4 m, particularly preferably from 1.3 m to 3 m. The thickness of the thus-obtained non-stretched film is preferably from 30 μm to 400 mμ, more preferably from 35 μm to 300 μm, particularly preferably from 40 μm to 200 μm.

The thus-obtained sheet is preferably trimmed before being taken up. The trim may be re-used as a material for producing the same kind of film or a different kind of film by subjecting it to a pulverizing treatment and, as needed, to a granulating treatment or a treatment of depolymerization and re-polymerization. It is also preferred, in view of preventing scratches, to provide a lamifilm on at least one surface of the film before being taken up.

[Optical Properties of the Cellulose Acylate Film]

(Fine Foreign Particles)

Next, fine foreign particles in the cellulose acylate film are described in detail below.

It is difficult to find by visual check the fine foreign particles in the cellulose acylate film, and is observed under a polarizing microscope. In the case of producing a polarizing plate-protecting film by using a cellulose acylate film containing the fine foreign particles and incorporating it in an image display device, there can be caused a trouble due to leakage of light particularly with black display where light is completely shut off.

Such fine foreign particles have a diameter of from 1 μm to less than 10 μm and can be observed under a polarizing microscope of cross-Nicol position. The number thereof acceptable for use as an optical film is preferably from 0 particle/mm² to 10 particles/mm², more preferably from 0 particle/mm² to 8 particles/mm², particularly preferably from 0/mm² to 5/mm².

(Retardation)

In this specification, Re and Rth represent an in-plane retardation and a retardation in the thickness direction, respectively, at a wavelength of λ nm. Re can be measured by means of KOBRA 21ADH (manufactured by Oji Keisoku Kiki K.K.) by introducing an incident light in the normal direction of the film. Rth is calculated by means of KOBRA 21ADH based on the above-mentioned Re and retardation values measured in plural directions such as a retardation value measured by introducing an incident light of a wavelength of λ nm in the direction +40° inclined with respect to the normal of the film with the in-plane slow axis (determined by KOBRA 21ADH) being the inclined axis (rotation axis) and a retardation value measured by introducing an incident light of a wavelength of λnm in the direction −40° inclined with respect to the normal of the film with the in-plane slow axis being the inclined axis (rotation axis). The wavelength λ is usually in the range of from 450 to 750 nm. In the invention a wavelength of 550 nm is used. Here, as a hypothetical value of the average refractive index, those values can be used which are described in Polymer Handbook (JOHN WILEY & SONS, INC) and various catalogues of optical films. With materials whose average refractive indexes are not known, the average refractive index can be measured by means of an Abbé's refractometer. Values of the average refractive indexes of main optical films are illustrated below. Cellulose acylate (1.48), cycloolefin polymer (1.52), polycarbonate (1.59), polymethyl methacrylate (1.49) and polystyrene (1.59).

nx (refractive index in the filming direction), ny (refractive index in the transverse direction) and nx (refractive index in the thickness direction) are calculated by inputting the hypothetical value of the average refractive index and the film thickness into KOBRA 21 ADH.

The non-stretched cellulose acylate film of the invention preferably has Re and Rth satisfying the following: Re is preferably from 0 nm to 300 nm, more preferably from 0 nm to 250 nm, particularly preferably from 10 nm to 200 nm. Rth is preferably from 0 nm to 500 nm, more preferably from 20 nm to 400 nm, particularly preferably from 30 nm to 350 nm.

[Stretching]

Next, stretching of the cellulose acylate film of the invention obtained by the melt-cast film production process is described below.

In order to effectively and significantly realize Re and Rth, it is preferred to stretch the cellulose acylate film. Stretching may be conducted in the course of the filming process in an on-line manner, or may be conducted in an off-line manner after completion of filming and once taking up the film. That is, in the case of melt-cast film production, stretching may be conducted either before or after the film is completely cooled.

Stretching is conducted at a temperature of preferably from Tg of the cellulose acetate film to Tg+50° C., more preferably from Tg+1° C. to Tg+30° C., particularly preferably from Tg+2° C. to Tg+20° C.

The percent of stretch is preferably from 1% to 500%, more preferably from 5% to 300%, still more preferably from 10% to 250%, particularly preferably from 20% to 200%. The stretching may be conducted in one step or multi-steps. The percent of stretch described above is determined according to the following numerical formula (9):

percent of stretch (%)=100×{(film length after stretching)−(film length before stretching)}/film length before stretching     numerical formula (9)

Such stretching is conducted by longitudinal stretching, transverse stretching or a combination thereof. In the longitudinal stretching, there may be employed (1) roll stretching (wherein stretching is conducted in the longitudinal direction by using two or more pairs of nip rolls which rotate so that rolls on the outlet side rotate with a faster peripheral speed) or (2) stretching in the longitudinal direction with both ends of the film being fixed (wherein both ends of the film are gripped and gradually drawn in the longitudinal direction). Further, in the transverse stretching, there may be employed tenter stretching (wherein both ends of the film are gripped with a chuck and expanded in the transverse direction (at right angles to the longitudinal direction). These longitudinal stretching and transverse stretching may be conducted alone (monoaxial stretching) or in combination thereof (biaxial stretching). In the case of biaxial stretching, the two stretchings may be conducted successively (successive stretching) or at the same time (simultaneous stretching).

The stretching rate for longitudinal or transverse stretching is preferably from 10%/min to 10,000%/min, more preferably from 20%/min to 1,000%/min, particularly preferably from 30%/min to 800%/min. In the multi-step stretching, the stretching rate means the average value of the stretching rates of respective stretching steps.

It is also preferred to conduct relaxation in the longitudinal or transverse direction by 0% to 10% subsequent to the stretching. Further, it is also preferred to thermally fix the film at a temperature of from 150° C. to 250° C. for 1 second to 3 minutes subsequent to the stretching.

The Rth acquired by such stretching is preferably from 0 nm to 500 nm, more preferably from 40 nm to 400 nm, particularly preferably from 60 nm to 350 nm. Also, the Re is preferably from 0 nm to 300 nm, more preferably from 20 nm to 250 nm, particularly preferably from 40 nm to 200 nm.

Re and Rth are in the relation of Re≦Rth, more preferably Re×1.5≦Rth, particularly preferably Re×2≦Rth. Such Re and Rth can be obtained by monoaxial stretching with both ends being fixed, more preferably by biaxial stretching in the longitudinal and transverse directions. Because, stretching in both longitudinal and transverse directions serves to render the difference between in-plane refractive indexes ($n_x$, $n_y$) small, thus Re being rendered small and, further, areal magnification is rendered large by the stretching in the longitudinal and transverse directions, which serves to strengthen orientation degree in the depth direction accompanied by reduction of thickness of the film, thus Rth being rendered large. Such Re and Rth serve to more reduce leakage of light in black display.

The thickness of the thus-stretched film is preferably from 10 μm to 300 μm, more preferably from 20 μm to 200 μm, particularly preferably from 30 μm to 100 μm.

Further, an angle of θ between the filming direction (longitudinal direction) and the slow axis of Re of the film is preferably as near 0°, +90° or −90° as possible. That is, in the case of longitudinal stretching, the angle is preferably as near 0° as possible. That is, the angle is preferably 0±3°, more preferably 0±2°, particularly preferably 0±1°. In the case of transverse stretching, the angle is preferably 90±3° or −90±3°, more preferably 90±2° or −90±2°, particularly preferably 90±1° or −90±1°.

The above-mentioned non-stretched or stretched cellulose acylate film may be used alone or in combination with a polarizing plate, or may be used by providing thereon a liquid crystal layer or a layer having a controlled refractive index (low reflective layer) or a hard coat layer.

[Photoelasticity Coefficient]

The cellulose acylate film of the invention is preferably used as a film for protecting a polarizing plate or as a redardation film. In the case of using the cellulose acylate film as a film for protecting a polarizing plate or as a redardation film, double refraction (Re, Rth) can change due to extension by moisture absorption or stress by contraction. Such change in double refraction caused by stress can be measured in terms of photoelasticity coefficient, and it is in the range of preferably from $5\times10^{-7}$ (cm$^2$/kgf) to $30\times10^{-7}$ (cm$^2$/kgf), more preferably from $6\times10^{-7}$ (cm$^2$/kgf) to $25\times10^{-7}$ (cm$^2$/kgf), particularly preferably from $7\times10^{-7}$ (cm$^2$/kgf) to $20\times10^{-7}$ (cm$^2$/kgf).

[Surface Treatment]

In some cases, it is possible to improve adhesion between the cellulose acylate film and each functional layer (e.g., an undercoat layer or a backing layer) to subject, as needed, the film to a surface treatment. For example, a glow discharge treatment, UV ray irradiation treatment, corona treatment, flame treatment or treatment with an acid or an alkali may be employed. The glow discharge treatment may be a plasma treatment using a low-temperature plasma generated under a low-pressure gas of 0.1 to 3,000 Pa or may be a plasma treatment under atmospheric pressure. A plasma-generating gas is a gas which generates a plasma under the above-mentioned conditions, and examples thereof include argon, helium, neon, krypton, xenon, nitrogen, carbon dioxide, flons such as tetrafluoromethane, and mixtures thereof. Detailed descriptions thereon are given in Hatsumei Kyokai Kokai Giho (Kogi Bango 2001-1745, published on Mar. 15, 2001 by Hatsumei Kyokai) on pages 30 to 32. Additionally, plasma treatment under atmospheric pressure which has been noted in recent years employs an irradiation energy of, for example, from 20 to 500 kGy under 10 to 1,000 keV, more preferably from 20 to 300 kGy under 30 to 500 keV. Of these, an alkali saponification treatment is particularly preferred, and is extremely effective for surface treatment of a cellulose acylate film.

[Alkali Saponification Treatment]

The alkali saponification treatment may be conducted by dipping in a saponifying solution or by coating a saponifying solution. With the dipping method, the cellulose acylate film is passed through a tank of an aqueous solution of NaOH or KOH having a pH of from 10 to 14 and being heated to 20° C. to 80° C. in 0.1 minute to 10 minutes, followed by neutralization, washing with water and drying.

With the coating method, there may be employed a dip coating method, a curtain coating method, an extrusion coating method, a bar coating method or an E-type coating method. As the solvent for the coating solution to be used for the alkali saponification treatment, a solvent which has a good wetting property and which can keep a good surface state without forming unevenness on the surface of the cellulose acylate film is preferably selected. Specifically, alcoholic solvents are preferred, with isopropyl alcohol being particularly preferred. It is also possible to use an aqueous solution of a surfactant as the solvent.

The alkali to be used in the coating solution for alkali treatment is preferably an alkali which dissolves in the above-described solvent, with KOH and NaOH being preferred. The pH of the coating solution for saponification treatment is preferably 10 or more, more preferably 12 or more. The reaction time for the alkali saponification is preferably from 1 second to 5 minutes, more preferably from 5 seconds to 5 minutes, particularly preferably from 20 seconds to 3 minutes, at room temperature. After completion of the alkali saponification reaction, the saponification solution-coated surface is preferably washed with water or with an acid then water. It is also possible to continuously conduct the saponification treatment by the coating method and application of an oriented film to be described hereinafter, which contributes to reduction of the number of steps. These saponification methods are specifically described in, for example, JP-A-2002-82226 and International Publication No. 02/46809 pamphlet.

It is also preferred to provide an undercoat layer for adhesion to a functional layer. This undercoat layer may be provided by coating after the above-mentioned surface treatment or may be provided without the surface treatment. Detailed descriptions on the undercoat layer are given in Hatsumei Kyokai Kokai Giho (Kogi Bango 2001-1745, published by Hatsumei Kyokai on Mar. 15, 2001), on page 32.

The surface treatment and the undercoating step can be provided at the final stage of the filming process, and may be conducted independently or during the step of providing a functional layer to be described hereinafter.

[Functional Layer]

It is preferred to combine the cellulose acylate film of the invention with functional layers described in detail in Hatsumei Kyokai Kokai Giho (Kogi Bango 2001-1745, published by Hatsumei Kyokai on Mar. 15, 2001) on pages 32 to 45. Among them, providing a polarizing film (to form a polarizing plate), providing an optical compensatory layer (to form an optical compensatory film) and providing an antireflective layer (to form an antireflective film) are preferred.

(1) Providing a Polarizing Film (Preparation of a Polarizing Plate)

A polarizing plate can be prepared by providing a polarizing film on the cellulose acylate film of the invention. The polarizing plate of the invention is a polarizing plate which comprises a polarizing film and two protective films sandwiching the polarizing film and is characterized in that at least one of protective films for the polarizing film is the cellulose acylate film or the retardation film of the invention. The polarizing film and the polarizing plate are described below.

[Materials to be Used]

At present commercially available polarizing films are generally prepared by dipping a stretched polymer in a solution of iodine or a dichroic dye retained in a tank to thereby permeate iodine or the dichroic cye into the polymer. As the polarizing film, a coating type polarizing film represented by that produced by Optiva Inc. may also be used. Iodine and the dichroic dye in the polarizing film is oriented in the polymer to exhibit their polarizing ability. As the dichroic dyes, azo-based dyes, stilbene-based dyes, pyrazolone-based dyes, triphenylmethane-based dyes, quinoline-based dyes, oxazine-based dyes, thiazine-based dyes or anthraquinone-based dyes are used. The dichroic dyes are preferably water-soluble. The dichroic dyes preferably have a hydrophilic substituent (e.g., a sulfo group, an amino group or a hydroxyl group). Examples thereof include those compounds which are described in Hatsumei Kyokai Kokai Giho (Kogi Bango 2001-1745, published on Mar. 15, 2001, p. 58).

As the polymer to be used for the polarizing film, both a polymer which itself can cause cross-linking and a polymer which can be linked with a cross-linking agent may be used, and a plurality of combinations thereof may be used. The binder includes methacrylate-based copolymers, styrenic copolymers, polyolefins, polyvinyl alcohol and modified polyvinyl alcohol, poly(N-methylolacrylamide), polyesters, polyimides, vinyl acetate copolymers, carboxymethyl cellulose and polycarbonates described in, for example, JP-A-8-338913, paragraph [0022]. A silane coupling agent may also be used as the polymer.

As the polymer to be used for the polarizing film, water-soluble polymers (e.g., poly(N-methylolacrylamide), carboxymethyl cellulose, gelatin, polyvinyl alcohol and modified polyvinyl alcohol) are preferred. More preferred are gelatin, polyvinyl alcohol and modified polyvinyl alcohol, and still more preferred are polyvinyl alcohol and modified polyvinyl alcohol. It is particularly preferred to use two polyvinyl alcohols or modified polyvinyl alcohols different from each other in polymerization degree. The saponification degree of polyvinyl alcohol is preferably from 70 to 100%, more preferably from 80 to 100%. The polymerization degree of polyvinyl alcohol is preferably from 100 to 5,000.

As the modified polyvinyl alcohol, descriptions thereon are given in JP-8-338913, JP-A-9-152509 and JP-A-9-316127. The polyvinyl alcohol and modified polyvinyl alcohol may be used in combination of two or more thereof.

The lower limit of the thickness of the polymer is preferably 10 μm. In view of light leakage of an image display device, a smaller thickness of the polymer is more preferred, and the upper limit thereof is preferably equal to or smaller than the thickness of the at present commercially available polarizing film (about 30 μm), more preferably equal to or smaller than 25 μm, particularly preferably equal to or smaller than 20 μm.

The polymer to be used for the polarizing film may be cross-linked. The polymer may be a polymer which has a cross-linkable functional group, a polymer to which is given cross-linking properties by mixing it with a monomer or a polymer compounded with a cross-linking agent to impart it cross-linking properties. Cross-linking may be caused by light, heat or change in pH to form a binder having a cross-linked structure. As to the cross-linking agent, descriptions are given in US Reissued Patent No. 23297. Also, a boron compound (e.g., boric acid or borax)) may be used as the cross-linking agent. The addition amount of the cross-linking agent for the binder is preferably from 0.1 to 20% by weight based on the weight of the polymer. Cross-linking of the polymer serves to improve orientation properties as a polarizing element and resistance to moist heat of the polarizing film.

The amount of the unreacted cross-linking agent at the completion of the cross-linking reaction is preferably 1.0% by weight or less, more preferably 0.5% by weight or less. Such amount serves to improve weatherability.

[Stretching of Polarizing Film]

The polarizing film is preferably dyed with iodine or a dichroic dye after being stretched (by stretching method) or being rubbed (rubbing method).

With the stretching method, the stretch ratio is preferably from 2.5:1 to 30.0:1, more preferably from 3.0:1 to 10.0:1. The stretching can be conducted by dry stretching in the air. Also, wet stretching may be employed in a state of being dipped in water. The stretch ratio in the dry stretching is preferably from 2.5:1 to 5.0:1, and the stretch ratio in the wet stretching is preferably from 3.0:1 to 10.0:1. The stretching may be conducted in a direction parallel to the MD direction or in a slant direction (slant stretching). Such stretching may be completed by one stretching procedure or by several stretching procedures. Stretching by several stretching procedures serves to more uniformly stretch even at a high stretch ratio. In the above descriptions, the term "stretch ratio" means (length after stretching/length before stretching).

A more preferred stretching is a slant stretching wherein stretching is conducted in a slant direction with a slant of from 10° to 80°.

(i) Method of Stretching in the Parallel Direction

The PVA film is swollen prior to stretching. The swelling ratio (ratio of weight after swelling to weight before swelling) is from 1.2:1 to 2.0:1. Thereafter, the film is stretched in an aqueous medium bath or in a dying bath containing dissolved therein a dichroic substance at a bath temperature of from 15° C. to 50° C., particularly from 17° C. to 40° C. while continuously conveying through guide rolls. Stretching can be performed by gripping the film using two pairs of nip rolls, with the conveying speed of the nip rolls at the latter position being larger than that of the nip, rolls at the former position. The stretch ratio is based on the ratio of the length after stretching/the initial length (hereinafter the same) and, in view of the aforesaid effects, the stretch ratio is from 1.2:1 to 3.5:1, particularly preferably from 1.5:1 to 3.0:1. Thereafter, the film is dried at a temperature of from 50° C. to 90° C. to obtain a polarizing film.

(ii) Method of Stretching in the Slant Direction

As this method, there may be employed a method, described in JP-A-2002-86554, of stretching by using a tenter which overhangs in the slant direction. Since this stretching is conducted in the air, it is necessary to incorporate water therein before stretching. The water content is preferably from 5% to 100%, more preferably from 10% to 100%.

The temperature upon stretching is preferably from 40° C. to 90° C., more preferably from 50° C. to 80° C. The humidity is preferably from 50% RH to 100% RH, more preferably from 70% RH to 100% RH, particularly preferably from 80% RH to 100% RH. The traveling speed in the longitudinal direction is preferably equal to or longer than 1m/min, more preferably equal to or longer than 3 m/min.

After completion of the stretching, the film is dried at a temperature of from 50° C. to 100° C., preferably from 60° C. to 90° C., for a period of from 0.5 minutes to 10 minutes, more preferably from 1 minute to 5 minutes.

The absorption axis of the thus-obtained polarizing film is preferably from 10° to 80°, more preferably from 30° to 60°, particularly preferably substantially 45° (40° to 50°).

[Lamination]

The saponified cellulose acylate film and the stretched polarizing film are laminated to each other to prepare a polarizing plate. The lamination is preferably conducted so that the angle between the direction of conveying the cellulose acylate film and the direction of stretching axis of the polarizing film becomes 45°.

An adhesive for lamination is not particularly limited, and examples thereof include PVA-based resins (including modified PVA having accetacetyl group, sulfonic acid group, carboxylic acid group or oxyalkylene group) and an aqueous solution of a boron-containing compound. Among them, the PVA-based resins are preferred. The dry thickness of the adhesive layer is preferably from 0.01 µm to 10 µm, particularly preferably from 0.05 µm to 5 µm.

As to the light transmittance and the polarizing degree of the thus-obtained polarizing plate, the higher, the more preferred. The transmittance of the polarizing plate for a light of 550 nm in wavelength is in the range of preferably from 30% to 50%, more preferably from 35% to 50%, particularly preferably from 40% to 50%. The polarizing degree for a light of 550 nm in wavelength is in the range of preferably from 90% to 100%, more preferably from 95% to 100%, particularly preferably from 99% to 100%.

Further, the thus-obtained polarizing plate can be laminated to a λ/4 plate to prepare a circularly polarizing plate. In this occasion, lamination is conducted so that the angle between the slow axis of the λ/4 plate and the absorption axis of the polarizing plate becomes 45°. The λ/4 plate is not particularly limited, but preferably has such wavelength dependence that retardation becomes smaller as the wavelength becomes shorter. Further, it is preferred to use a λ/4 plate comprising a polarizing film having an absorption axis inclined with an angle of from 20° to 70° with respect to the longitudinal direction and an optical compensatory layer comprising a liquid crystalline compound.

The thickness of the polarizing film (layer) is preferably from 25 to 350 µm, more preferably from 30 to 200 µm, more preferably from 40 to 120 µm. In the case of using the cellulose acylate film of the invention as a protective film for the polarizing membrane, it may be used as a non-stretched film or a stretched film. It is also preferred to use the stretched cellulose acylate film of the invention for its function of protecting the polarizing film and its retardation compensatory function.

The thus-obtained polarizing plate preferably has the following constitutions. Here, as the non-stretched cellulose triacetate film, FUJI TAC TD80, TD80U and TD80UE manufactured by Fuji Photo Film Co., Ltd. may preferably be used.

Polarizing plate A: non-stretched cellulose acylate film/polarizing film/non-stretched cellulose triacetate film
Polarizing plate B: non-stretched cellulose acylate film/polarizing film/non-stretched cellulose acylate film
Polarizing plate C: stretched cellulose acylate film/polarizing film/non-stretched cellulose triacetate film
Polarizing plate D: stretched cellulose acylate film/polarizing film/non-stretched cellulose acylate film
Polarizing plate E: stretched cellulose acylate film/polarizing film/stretched cellulose acylate film (2) Providing an Optical Compensatory Layer (Preparation of an Optical Compensatory Film)

The optical compensatory layer is a layer for compensating a liquid crystal compound in a liquid crystal cell provided in a liquid crystal display device in displaying black, and can be formed by forming an orienting film on the cellulose acylate film and, further, an optical compensatory layer on the orienting film.

[Orienting Film]

An orienting film is provided on the surface-treated cellulose acylate film. The orienting film has a function of deciding the orientation direction of liquid crystalline molecules. However, when the oriented state of the liquid crystalline compound is fixed after orientation of the compound, the orienting film is not necessary because its function has been fulfilled. That is, it is possible to transfer only the optical compensatory layer having a fixed orientation state on the orienting film onto a polarizing film to thereby prepare an optical compensatory film using the cellulose acylate film of the invention.

The orienting film can be provided by, for example, rubbing treatment of an organic compound (preferably a polymer), oblique vacuum deposition, formation of a layer having microgrooves or accumulation of an organic compound (e.g., ω-tricosanoic acid, dioctadeylmethylammonium chloride or methyl stearate) by Langmuir-Blodgett method (LB membrane). Further, there are known orienting films which generate their orienting function when magnetic field is applied thereto or when they are irradiated with light.

The orienting film is formed preferably by rubbing treatment of a polymer. The polymer to be used for the orienting film has, in principle, a molecular structure capable of orienting liquid crystal molecules.

In the invention, in addition to the function of orienting liquid crystal molecules, it is preferred to bind a side chain having a cross-linkable functional group (e.g., double bond) to the main chain or to introduce a cross-linkable functional group having a function of orienting liquid crystalline molecules to the side chain of the polymer.

As the polymer to be used for the orienting film, either of a polymer which itself can cause cross-linking and a polymer which can be cross-linked with a cross-linking agent can be used. It is also possible to employ a combination thereof. Examples of the polymer include methacrylate-based copolymers described in, for example, JP-A-8-338913, paragraph [0022], styrenic copolymers, polyolefins, polyvinyl alcohol and modified polyvinyl alcohol, poly(N-methylolacrylamide), polyesters, polyimides, vinyl acetate-based copolymers, carboxymethyl cellulose and polycarbonates. It is also possible to use a silane coupling agent as the polymer.

As the polymer to be used for the orienting film, water-soluble polymers (e.g., poly(N-methylolacrylamide), carboxymethyl cellulose, gelatin, polyvinyl alcohol and modified polyvinyl alcohol) are preferred, gelatin, polyvinyl alcohol and modified polyvinyl alcohol are more preferred, and polyvinyl alcohol and modified polyvinyl alcohol are particularly preferred. It is particularly preferred to use two or more polyvinyl alcohols or modified polyvinyl alcohols in combination thereof. The saponification degree of polyvinyl alcohol is preferably from 70% to 100%, more preferably from 80% to 100%. The polymerization degree of polyvinyl alcohol is preferably from 100 to 5,000.

The side chain having the function of orienting liquid crystal molecules generally has a hydrophobic group as a functional group. Specific kind of the functional group is decided depending upon kind of the liquid crystal molecule and necessary orientation state.

For example, a modifying group for the modified polyvinyl alcohol can be introduced by modification by copolymerization, modification by chain transfer or modification by block polymerization. Examples of the modifying group include a hydrophilic group (e.g., a carboxylic acid group, a sulfonic acid group, a phosphonic acid group, an amino group, an ammonium group, an amido group or a thiol group), a hydrocarbon group having from 10 to 100 carbon atoms, a fluorine atom-substituted hydrocarbon group, a thioether group, a polymerizable group (e.g., an unsaturated polymerizable group, an epoxy group or an aziridinyl group) or an alkoxysilyl group (e.g., trialkoxy, dialkoxy or monoalkoxy). Specific examples of these modified polyvinyl alcohol compounds include those which are described in, for example, JP-A-2000-155216, paragraphs [0022] to [0145], and JP-A-2002-62426, paragraphs [0018] to [0022].

The polymer of the orienting film and the multi-functional monomer contained in the optical compensatory layer can be copolymerized with each other by connecting the side chain having cross-linkable functional group to the main chain of the orienting film polymer or by introducing a cross-linkable functional group into the side chain having the function of orienting liquid crystal molecules. As a result, strong conjugated bonds are formed between the orienting film polymer and the orienting film polymer and between the multi-functional monomer and the orienting film polymer as well as between the multi-functional monomer and the multi-functional monomer. Thus, strength of the optical compensatory film can remarkably be improved by introducing the cross-linkable functional group into the orienting film polymer.

The cross-linkable functional group of the orienting film polymer preferably contains a polymerizable group as is the same with the multi-functional monomer. Specific examples thereof include those described in, for example, JP-A-2000-155216, paragraphs [0080] to [0100]. The orienting film polymer can be cross-linked using a cross-linking agent besides the above-mentioned cross-linkable functional group.

Examples of the cross-linking agent include an aldehyde, an N-methylol compound, a dioxane derivative, a compound capable of functioning as a cross-linking agent by activating carboxyl group, an active vinyl compound, an active halogen-containing compound, isoxazole and dialdehyde starch. Two or more of the cross-linking agents may be used in combination thereof. Specific examples thereof include those compounds which are described in, for example, JP-A-2002-62426, paragraphs [0023] to [0024]. A highly reactive aldehyde is preferred, with glutaraldehyde being particularly preferred.

The addition amount of the cross-linking agent is preferably from 0.1 to 20% by weight, more preferably from 0.5 to 15% by weight, based on the weight of the polymer. The amount of unreacted cross-linking agent remaining in the orienting film after cross-linking is preferably equal to or less than 1.0% by weight, more preferably equal to or less than 0.5% by weight. Such amounts ensure sufficient durability of not causing reticulation even when the orienting film is used for a long time in a liquid crystal display device or left for a long period in the atmosphere of high temperature and high humidity.

The orienting film can be formed basically by coating on-the cellulose acylate film a coating solution containing the aforesaid polymer which is a material for forming the orienting film and a cross-linking agent, drying under heating (to cross-link), then subjecting to rubbing treatment. As has been described hereinbefore, the cross-linking reaction may be conducted at any stage after coating of the coating solution on the cellulose acylate film. In the case of using a water-soluble polymer such as polyvinyl alcohol as the orienting film-forming material, the coating solution is preferably prepared by using as a solvent a mixture of an organic solvent (e.g., methanol) having an anti-foaming function and water. The mixing ratio of water:methanol is preferably 0:100 to 99:1, more preferably from 0:100 to 91:9. Thus, generating of foam is depressed, and defects of the orienting film and, further, defects of the surface of the optically anisotropic layer can remarkably be reduced.

As a method for coating the orienting film, a spin coating method, a dip coating method, a curtain coating method, an extrusion coating method, a rod coating method or a roll coating method is preferred, with rod coating method being particularly preferred. The dry thickness of the orienting film is preferably from 0.1 to 10 μm. The drying under heating can be conducted at a temperature of from 20° C. to 110° C. In order to form sufficient cross-linking, the temperature is preferably from 60° C. to 100° C., more preferably from 80° C. to 100° C. The drying time can be from 1 min to 36 hours, and is preferably from 1 minute to 30 min. The pH is preferably set to a level optimal for a cross-linking agent to be used. In the case of using glutaraldehyde, the pH is preferably from 4.5 to 5.5, particularly preferably from 4.8 to 5.2.

The orienting film is provided on the cellulose acylate film or the aforesaid undercoat layer. The orienting film can be obtained by cross-linking the polymer layer as described above, then subjecting the surface thereof to rubbing treatment.

As the rubbing treatment, a treating method widely employed as a method for orienting liquid crystal of LCD can be applied. That is, there may be employed a method of orienting by rubbing the surface of the orienting film in a definite direction by using paper, gauge, felt, rubber, nylon fibers or polyester fibers. In general, rubbing treatment is conducted by rubbing several times using cloth uniformly implanted with fibers having a uniform length and thickness.

In the case of conducting on an industrial scale, the rubbing treatment can be conducted by bringing a film having the orienting film, while conveying the film, into contact with a rotating rubbing roll. The roundness, cylinder degree and deflection (eccentricity) of the rubbing roll are all preferably 30 μm or less. The lapping angle of the film with respect to the rubbing roll is preferably from 0.1° to 90°. However, as is described in JP-A-8-160430, it is also possible to perform stable rubbing treatment by winding 360° or more. The film-conveying rate is preferably from 1 m/min to 100 m/min. As to the rubbing angle, a proper rubbing angle is preferably selected in the range of from 0° to 60°. In the case of using in a liquid crystal display device, the angle is preferably from 40° to 50°, with 45° being particularly preferred.

The thickness of the thus-obtained orienting film is preferably in the range of from 0.1 μm to 10 μm.

Next, the liquid crystalline molecules of the optical compensatory layer are oriented on the orienting film. Then, as needed, the orienting film polymer is cross-linked by reacting the orienting film polymer with the multi-functional monomer contained in the optical compensatory layer or by using the cross-linking agent.

The liquid crystalline molecules used in the optical compensatory layer include rod-like liquid crystalline molecules and discotic liquid crystalline molecules. The rod-like liquid crystalline molecules and discotic liquid crystalline molecules may be high molecular liquid crystals or low molecular liquid crystals. Further, there are included those wherein low molecular liquid crystal molecules are cross-linked to lose liquid crystal properties.

[Rod-like Liquid Crystalline Molecules]

As the rod-like liquid crystalline molecules, azomethines, azoxy compounds, cyanobiphenyls, cyanophenylesters, benzoates, phenyl cyclohexanecarboxylates, cyanophenylcyclohexanes, cyano-substituted phenylpyridines, alkoxy-substituted phenylpyrimidines, phenyldioxanes, tolans and alkenylcyclohexylbenzonitriles are preferably used.

Additionally, the rod-like liquid crystal molecules include metal complexes as well. Also, liquid crystal polymers containing the rod-like liquid crystalline molecule in repeating units thereof can be used as the rod-like liquid crystalline molecules. In other words, the rod-like liquid crystalline molecules may be bound to a (liquid crystal) polymer.

As to the rod-like liquid crystalline molecules, descriptions are given in quaterly Kagaku Sosetsu, vol. 22, Ekisho No Kagaku (1994) compiled by Nihon Kagakukai, chapters 4, 7 and 11 and Ekisho Device Handbook, compiled by Nihon Gijutsu Shinkokai 142$^{nd}$ Iinkai, chapter 3.

The double refraction of the rod-like liquid crystalline molecules is preferably in the range of from 0.001 to 0.7.

In order to fix the orientation state of the rod-like liquid crystalline molecules, they preferably have a polymerizable group. The polymerizable group is preferably a radical-polymerizable unsaturated group or a cation-polymerizable group. Specific examples thereof include the polymerizable groups and polymerizable liquid crystalline compounds described in, for example, JP-A-2002-62427, paragraphs [0064] to [0086].

[Discotic Liquid Crystalline Molecules]

The discdotic liquid crystallinemolecules include benzene derivatives described in a report by C. Destrade et al., Mol. Cryst., 71, 111 (1981); truxene derivatives described in a report by C. Destrade et al., Mol. Cryst., 122, 141 (1985) and a report of Physics lett, A, 78, 82 (1990); cyclohexane derivatives described in a report by B. Kohne et al., Angew. Chem., 96, 70 (1984); and azacrown-based or phenylacetylene-based macrocycles described in a report by J. M. Lehn et al., J. Chem. Commun., p. 1794 (1985) and a report by J. Zhang et al., J. Am. Chem. Soc., 116, 1655 (1994).

The discotic liquid crystalline molecules include those compounds which have a structure wherein straight-chain alkyl groups, alkoxy groups or substituted benzoyloxy groups present in a radial pattern as a side chain of a mother nucleus locating at the center of the molecule. The compound is preferably a compound whose molecule or aggregate has a rotational symmetry and can impart a definite orientation. In an optical compensatory layer formed by the discotic liquid crystalline molecules, the compound molecules finally contained in the optical compensatory layer are not necessarily discotic liquid crystalline molecules. For example, low molecular discotic liquid crystalline molecules having a group capable of reacting by heat or light and undergoing reaction by heat or light to form a polymer thereof and finally losing the liquid crystalline properties as a result of polymerization or cross-linking are also included. Preferred examples of the discotic liquid crystalline molecules are described in JP-A-8-50206. As to polymerization of the discotic liquid crystalline molecules, descriptions are given in JP-A-8-27284.

In order to fix the discotic liquid crystalline molecules by polymerization, it is necessary to connect a polymerizable group as a substituent to a discotic core of the discotic liquid crystalline molecule. Compounds wherein the discotic core and the polymerizable group are connected to each other through a linking group are preferred. Thus, orientation state can be maintained in the polymerization reaction. Examples of such compound are described in, for example, JP-A-2000-155216, paragraphs [0151] to [0168].

In hybrid orientation, an angle between the longer axis of the discotic liquid crystalline molecule (discotic plane) and the plane of the polarizing film increases or decreases as the distance from the plane of the polarizing film increases in the depth direction of the optical compensatory layer. The angle preferably decreases as the distance increases. Further, as to change of the angle, possible change includes a continuous increase, a continuous decrease, an intermittent increase, an intermittent decrease, a change including both continuous increase and continuous decrease, and an intermittent change including an increase and a decrease. The intermittent change includes a region wherein the oblique angle does not change. The change may include a region wherein the oblique angle does not change as long as it increases or decreases as a whole. Further, the angle is changed preferably in a continuous manner.

The average direction of the longer axis of each discotic liquid crystalline molecule can generally be adjusted by selecting the material of the discotic liquid crystalline molecule or the orienting film or by selecting the method of rubbing treatment. Also, the direction of the longer axis of the discotic liquid crystalline molecule (discotic plane) on the surface side (air side) can generally be adjusted by selecting the kind of discotic liquid crystalline molecule or the kind of additive to be used together with the discotic liquid crystalline molecule. Examples of the additive to be used together with the discotic liquid crystal molecules include a plasticizer, a surfactant, a polymerizable monomer and a polymer. The degree of change in the orientation direction of the longer axis can similarly be adjusted by selecting the kinds of the liquid crystalline molecule and the additive.

[Other Constituents of the Optical Compensatory Layer]

Uniformity of a coated film, film strength and orienting properties of liquid crystalline molecules can be improved by using a plasticizer, a surfactant or a polymerizable monomer together with the above-mentioned liquid crystalline molecules. As such constituents, those which have a good compatibility with the liquid crystalline molecules and can impart change in the oblique angle of the liquid crystalline molecules or do not inhibit orientation are preferred.

The polymerizable monomer includes a radical-polymerizable compound and a cation-polymerizable compound. A multi-functional, radical-polymerizable monomer which is copolymerizable with the polymerizable group-containing liquid crystal compound described above is preferred. Examples thereof include those described in JP-A-2002-296423, paragraphs [0018] to [0020]. The addition amount of the compound is generally in the range of from 1% by weight to 50% by weight, preferably in the range of from 5% by weight to 30% by weight.

The surfactant includes conventionally known compounds, with fluorine-containing compounds being particularly preferred. Specific examples thereof are described in JP-A-2001-330725, paragraphs [0028] to [0056].

The polymer to be used together with the discotic liquid crystalline molecules can preferably impart change in the oblique angle to the discotic liquid crystalline molecule.

Examples of the polymer include cellulose acylates. Preferred examples of the cellulose acylates are those which are described in JP-A-2000-155216, paragraph [0178]. The addition amount of the polymer is in the range of preferably from 0.1% by weight to 10% by weight, more preferably from 0.1% by weight to 8% by weight based the weight of liquid crystalline molecules in order not to inhibit orientation of the liquid crystalline molecules.

The temperature at which phase transition takes place between discotic-nematic liquid crystal phase and the solid phase is preferably from 70° C. to 300° C., more preferably from 70° C. to 170° C.

[Formation of the Optical Compensatory Layer]

The optical compensatory layer can be formed by coating on an orienting film a coating solution containing liquid crystalline molecules and, as needed, a polymerization initiator and an optional component.

As a solvent to be used for preparing the coating solution, an organic solvent is preferably used. Preferred examples of preferred solvents include amides (e.g., N,N-dimethylformamide), sulfoxides (e.g., dimethylsulfoxide), hetero ring compounds (e.g., pyridine), hydrocarbons (e.g., benzene and hexane), alkylhalides (e.g., chloroform, dichloromethane and tetrachloroethane), esters (e.g., methyl acetate and butyl acetate), ketones (e.g., acetone and methyl ethyl ketone) and ethers (e.g., tetrahydrofuran and 1,2-dimethoxyethane). Two or more of the organic solvents may be used in combination thereof.

Coating of the coating solution can be conducted by a known method (e.g., a wire bar coating method, an extrusion coating method, a direct gravure coating method, a reverse gravure coating method or a die coating method).

The thickness of the optical compensatory layer is preferably from 0.1 μm to 20 μm, more preferably from 0.5 μm to 15 μm, particularly preferably from 1 μm to 10 μm.

[Fixing of Orientation State of the Liquid Crystalline Molecules]

The oriented liquid crystalline molecules can be fixed with the orientation state being maintained. Fixing is preferably conducted by polymerization reaction. The polymerization reaction includes a thermal polymerization reaction using a thermal polymerization initiator and a photo polymerization reaction using a photo polymerization initiator, with photo polymerization reaction being preferred.

Examples of the photo polymerization initiator include a-carbonyl compounds (described in U.S. Pat. Nos. 2,367,661 and 2,367,670), acyloin ethers (described in U.S. Pat. No. 2,448,828), α-hydrocarbone substituted aromatic acyloin compounds (described in U.S. Pat. No. 2,722,512), polynuclear quinine compounds (described in U.S. Pat. Nos. 3,046,127 and 2,951,758), a combination of triarylimidazole dimmer and p-aminophenylketone (described in U.S. Pat. No. 3,549,367), acridine and phenazine compounds (described in JP-A-60-105667 and U.S. Pat. No. 4,239,850) and oxadiazoles (described in U.S. Pat. No. 4,212,970).

The amount of the photo polymerization initiator to be used is in the range of preferably from 0.01% by weight to 20% by weight, more preferably from 0.5% by weight to 5% by weight, based on the amount of solids of the coating solution.

UV rays are preferably used for the light irradiation for polymerization of the liquid crystalline molecules.

The irradiation energy is in the range of preferably from 20 mJ/cm$^2$ to 50 J/cm$^2$, more preferably from 20 mJ/cm$^2$ to 5,000 mJ/cm$^2$, particularly preferably from 100 mJ/cm$^2$ to 800 mJ/cm$^2$. In order to accelerate the photo polymerization reaction, UV ray irradiation may be performed under heating condition.

A protective layer may be provided on the optical compensatory layer.

It is also preferred to combine this optical compensatory film with the polarizing film. That is, a thin polarizing plate which receives only a small stress (distortion×cross section×modulus of elasticity) upon dimensional change of the polarizing film can be obtained by using the optical compensatory film in place of the protective film in the polarizing plate.

When set in a large-sized liquid crystal display device, a polarizing plate using the cellulose acylate film of the invention can display an image with a high display quality without causing the problem of light leakage.

Stretching is preferably conducted so that the oblique angle between the polarizing film and the optical compensatory layer becomes the same as the angle between the transparent axis of the two polarizing plates laminated on both sides of a liquid crystal cell constituting LCD and the longitudinal or transverse direction of the liquid crystal cell. The oblique angle is usually 45°. Recently, however, devices wherein the angle is not necessary 45° have been developed among transmission type, reflection type and semi-transmission type LCDs. Thus, it is preferred that stretching direction can freely be selected to the design of LCD.

(3) Providing an Anti-reflective Layer (Anti-reflective Film)

The anti-reflective layer generally comprises a layer having a low refractive index (low refractive index layer) which also functions as a stainproof layer and at least one layer having a refractive index higher than that of the low refractive index layer (i.e., a layer having a high refractive index or a layer having a middle refractive index), and the anti-reflective film is obtained by providing the anti-reflective layer on the cellulose acylate film of the invention.

As a method for forming a multi-layer film wherein transparent thin films of inorganic compounds (e.g., metal oxides) having different refractive indexes are laminated one over the other, there are illustrated a chemical vacuum deposition method (CVD), a physical vacuum deposition method (PVD) and a method of forming a thin film by forming a film of colloidal metal oxide particles through a sol/gel method using a metal compound such as a metal alkoxide, then subjecting to an after-treatment (UV irradiation: JP-A-9-157855; plasma treatment: JP-A-2002-327310).

On the other hand, as an anti-reflective layer having a high productivity, there have been proposed various anti-reflective layers formed by coating a coating solution for forming a thin film containing inorganic particles dispersed in the matrix. Further, there is illustrated an anti-reflective film having an anti-reflective layer with glare-reducing properties imparted by forming a fine uneven pattern on the uppermost surface of the thus-coated anti-reflective layer.

The cellulose acylate film of the invention can be applied to any of the above-described methods, with the coating method (coating type) being particularly preferred.

[Layer Structure of a Coating Type Anti-reflective Film]

An anti-reflective layer having at least a middle refractive index layer, a high refractive index layer and a low refractive index layer (outermost layer) on the cellulose acylate film is designed so that the layers have refractive indexes satisfying the following relation:

refractive index of the high refractive index layer>refractive index of the middle refractive index layer>refractive index of the cellulose acylate film>refractive index of the low refractive index layer.

A hard coat layer may be provided between the cellulose acylate film and the middle refractive index layer. Also, a structure of middle refractive index hard coat layer, a high refractive index layer and a low refractive index layer may be employed.

Each of these layers are described in, for example, JP-A-8-122504, JP-A-8-110401, JP-A-10-300902, JP-A-2002-243906 and JP-A-2000-111706.

Further, each of the above-described layers may have additional other function. For example, there are illustrated a low refractive index layer having stainproof properties and a high refractive index layer having antistatic properties (e.g., JP-A-10-206603 and JP-A-2002-243906).

The haze of the anti-reflective film is preferably 5% or less, more preferably 3% or less. The hardness of the anti-reflective film is preferably H or more, more preferably 2H or more, particularly preferably 3H or more, measured by the pencil hardness test according to JIS K-5400.

[High Refractive Index Layer and Middle Refractive Index Layer]

A layer having a high refractive index in the anti-reflective film comprises a curable film containing at least super-fine particles of an inorganic compound of 100 nm or less in average particle size with a high refractive index and a matrix binder.

As the fine particles of inorganic compound with a high refractive index, there are illustrated inorganic compounds having a refractive index of 1.65 or more, more preferably 1.9 or more. Examples thereof include oxides of Ti, Zn, Sb, Sn, Zr, Ce, Ta, La and In, and composite oxides containing these metal atoms.

In order to obtain the super-fine particles, there are illustrated to treat the particle surface with a surface-treating agent (e.g., a silane coupling agent: JP-A-11-295503, JP-A-11-153703 and JP-A-2000-9908; an anionic compound or an organometallic coupling agent: JP-A-2001-310432); to form a core-shell structure with a high refractive index particle as a core (JP-A-2001-166104), and to use a specific dispersing agent in combination (JP-A-11-153703, U.S. Pat. No. 6,210,858(B1), and JP-A-2002-2776069).

As a matrix-constituting material, there are illustrated conventionally known thermoplastic resins and thermosetting resins.

Further, At least one composition selected from among compositions containing a multi-functional compound having at least two radical-polymerizable and/or cation-polymerizable groups and compositions containing an organometallic compound having a hydrolysable group and its partial condensation product is preferred. For example, there are illustrated compounds described in, for example, JP-A-2000-47004, JP-A-2001-315242, JP-A-2001-31871 and JP-A-2001-296401.

Also, a curable film obtained from a colloidal metal oxide obtained from a hydrolysis condensate of a metal alkoxide, and an metal alkoxide composition is preferred, which is described in, for example, JP-A-2001-293818.

The refractive index of the high refractive index layer is generally from 1.70 to 2.20. The thickness of the high refractive index layer is preferably from 5 nm to 10 μm, more preferably from 10 nm to 1 μm.

The refractive index of the middle refractive index layer is adjusted to be a value between the refractive index of the low refractive index layer and the refractive index of the high refractive index layer. The refractive index of the middle refractive index layer is preferably from 1.50 to 1.70.

[Low Refractive Index Layer]

The low refractive index layer is to be laminated on the high refractive index layer. The refractive index of the low refractive index layer is from 1.20 to 1.55, preferably from 1.30 to 1.50.

The low refractive index layer is preferably constituted as an outermost layer having scratch-resistant properties and stainproof properties. As a means to remarkably improve scratch-resistant properties, it is effective to impart slipping properties to the surface. Such means as introduction of a conventionally known silicone and introduction of fluorine into the thin layer can be applied.

Cross-linking reaction or polymerization reaction of a fluorine-containing compound and/or silicone compound having a cross-linkable or polymerizable functional group with the polymer is preferably conducted by irradiating with light or heating simultaneously with, or after, coating a coating composition for forming the outermost layer containing a polymerization initiator or a sensitizing agent.

The refractive index of the fluorine-containing compound is preferably from 1.35 to 1.50, preferably from 1.36 to 1.47. The fluorine-containing compound is preferably a compound containing a cross-linkable or polymerizable functional group in the range of from 35% by weight to 80% by weight.

Examples of the fluorine-containing compound include compounds described in JP-A-9-222503, paragraphs [0018] to [0026], JP-A-11-38202, paragraphs [0019] to [0030], JP-A-2001-40284, paragraphs [0027] to [0028] and JP-A-2000-284102, compounds represented by the general formulae 1 and 2 described in JP-A-2004-45462. Preferred specific examples are described in JP-A-2004-45462, paragraphs [0043] to [0047].

The silicone compound is preferably a compound having a polysiloxane structure and a curable functional group or a polymerizable functional group in the high polymer chain and forming a cross-linking structure in the film. For example, there are illustrated reactive silicones {e.g., SILAPLANE manufactured by CHISSO CORPORATION}, polysiloxanes having silanol group at each end (JP-A-11-258403) and compounds described in JP-A-2003-329804, paragraphs [0035] to [0046].

Also, a sol/gel curable film is preferred which is cured by condensation reaction between an organometallic compound such as a silane coupling agent and a-silane coupling agent having a specific fluorine-containing hydrocarbon group in the co-presence of a catalyst.

Preferred examples of the compound for forming the low refractive index layer include silane compounds having a polyfluoroalkyl group or the partially hydrolyzed condensation product thereof (compounds described in, e.g., JP-A-58-142958, JP-A-58-147483, JP-A-58-147484, JP-A-9-157582 and JP-A-11-106704), and silyl compounds having a fluorine-containing long chain group of poly(perfluoroalkyl ether) group (compounds described in JP-A-2000-117902, JP-A-2001-48590 and JP-A-2002-53804).

The low refractive index layer can contain, as other additives than the above-described ones, a filler {e.g., low refractive index inorganic compounds having an average particle size of the primary particle of from 1 nm to 150 nm, such as silicon dioxide (silica), fluorine-containing particles (e.g., magnesium fluoride, calcium fluoride or barium fluoride), and organic fine particles described in JP-A-11-3820, paragraphs [0020] to [0038]}, a silane coupling agent, a slip agent and a surfactant.

When the low refractive index layer is positioned under the outermost layer, the low refractive index layer may be formed by a gas phase method (e.g., a vacuum vapor deposition method, a sputtering method, an ion plating method or a plasma CVD method). A coating method is preferred because of its low production cost. The thickness of the low refractive index layer is preferably from 30 nm to 200 nm, more preferably from 50 nm to 150 nm, particularly preferably from 60 nm to 120 nm.

[Hard Coat Layer]

The hard coat layer is provided on the surface of the cellulose acylate film in order to impart a sufficient physical strength to the anti-reflective film. It is particularly preferred to provide the hard coat layer between the cellulose acylate film and the high refractive index layer.

The hard coat layer is preferably formed by cross-linking reaction or polymerization reaction of a light- and/or heat-curable compound.

As the curable functional group, a photo-polymerizable functional group is preferred, and the organometallic compound having a hydrolysable functional group is preferably an organic alkoxysilyl compound.

As a specific composition for constituting the hard coat layer, those which are described in, for example, JP-A-2002-144913, JP-A-2000-9908 and International Publication No. 00/46617 pamphlet.

The high refractive index layer can also function as the hard coat layer. In such case, it is preferred to form the layer by incorporating fine particles in the hard coat layer in a finely dispersed state by employing the method described with respect to the high refractive index layer.

The hard coat layer can also function as an anti-glare layer having an anti-glare-function (to be described hereinafter) when particles of from 0.2 µm to 10 µm in average particle size are incorporated therein.

The thickness of the hard coat layer can properly be designed depending upon use. The thickness of the hard coat layer is preferably from 0.2 µm to 10 µm, more preferably from 0.5 µm to 7 µm.

As to durability of the hard coat layer, its hardness is preferably H or more, more preferably 2H or more, particularly preferably 3H or more, measured by the pencil hardness test according to JIS K-5400. Also, regarding abrasion resistance, a hard coat layer producing a less amount of abrasion of a test piece thereof after the Taber's abrasion resistance test according to JIS K-5400 is more preferred.

[Forward Scattering Layer]

The forward scattering layer is provided for the purpose of imparting the effect of improving viewing angle when the visual angle is slanted in the direction up and down or left and right in the case of applying the resulting anti-reflective film to an image display device. The hard coat layer can also function as the forward scattering layer when fine particles having a different refractive index are dispersed in the hard coat layer.

As the forward scattering layer, there are illustrated that which has a specific forward scattering coefficient (described in JP-A-11-38208), that wherein the relative refractive index between the transparent resin and the fine particles is adjusted to a specific range (described in JP-A-2000-199809), and that whose haze value is specified to be 40% or more (described in JP-A-2002-107512).

[Other Layers]

In addition to the above-described layers, there may be provided a primer layer, an antistatic layer, an undercoat layer and a protective layer.

[Coating Method]

Each of the layers of the anti-reflective layer can be formed by coating according to a dip coating method, an air knife coating method, a curtain coating method, a roller coating method, a wire bar coating method, a gravure coating method, a micro-gravure coating method or an extrusion coating method (U.S. Pat. No. 2,681,294).

[Anti-glare Function]

The anti-reflective film may have an anti-glare function for scattering outer light. The anti-glare function can be obtained by forming unevenness on the surface of the anti-reflective film. With an anti-reflective film having the anti-glare function, the haze of the anti-reflective film is preferably from 3% to 30%, more preferably from 5% to 20%, particularly preferably from 7% to 20%.

As a method for forming unevenness on the surface of the anti-reflective film, any method may be employed that can form the uneven state of the surface which can be kept for a sufficient time. For example, there are illustrated a method of forming unevenness on the film surface by using fine particles in the low refractive index layer (e.g., JP-A-2000-271878), a method of adding comparatively large particles (0.05 µm to 2 µm in particle size) to a layer under the low refractive index layer (high refractive index layer, middle refractive index layer or hard coat layer) in a comparatively small amount (from 0.1% by weight to 50% by weight) to form a surface-uneven film, and providing a low refractive index layer with keeping the unevenness (e.g., JP-A-2000-281410, JP-A-2000-95893, JP-A-2001-10000 and JP-A-2001-281407), a method of providing the outermost layer (stainproof layer) and physically transferring an uneven form onto the surface (e.g. an embossing method described in JP-A-63-278839, JP-A-11-183710 and JP-A-2000-275401).

[Image Display Device]

The image display device of the invention is characterized in that at least one of the cellulose acylate film, retardation film, polarizing plate, optical compensatory film and anti-reflective film is provided on the surface of image display. The anti-reflective film and the polarizing plate of the invention can be applied to an image display device such as a liquid crystal display device (LCD) or an organic EL device. The image display device of the invention is preferably applied to a transmission-type, reflection-type or semi-reflection-type, liquid crystal display device of any of TN, STN, IPS, VA and OCB modes. More detailed descriptions thereon are given below.

(TN-mode Liquid Crystal Display Device)

TN-mode liquid crystal display devices are most popularly utilized as color TFT liquid crystal display devices and are described in many literatures. As to orientation state in the liquid crystal cell upon TN-mode black display, rod-like liquid crystalline molecules are in a standing position in the central portion of the cell and in a lying position in the vicinity of the substrate of the cell.

(OCB-mode Liquid Crystal Display Device)

The liquid crystal cell in this device is a bend orientation mode liquid crystal cell wherein rod-like liquid crystalline molecules are oriented in substantially reverse directions (symmetrically) between in the upper portion and in the lower portion of the liquid crystal cell. The liquid crystal display device using the bend orientation mode liquid crystal cell is disclosed in U.S. Pat. Nos. 4,583,825 and 5,410,422. Since the rod-like liquid crystalline molecules are symmetrically oriented between in the upper portion and in the lower portion of the liquid crystal cell, the bend orientation mode liquid crystal cell has self optical compensatory function. Thus, this liquid crystal mode is also called OCB (Optically Compensatory Bend) liquid crystal mode.

As is the same with the TN-mode liquid crystal cell, the OCB-mode liquid crystal cell is in an orientation state upon black display wherein rod-like liquid crystalline molecules are in a standing position in the central portion of the cell and in a lying position in the vicinity of the substrate of the cell.

(VA-mode Liquid Crystal Display Device)

The VA-mode liquid crystal display device is characterized in that the rod-like liquid crystalline molecules are substantially vertically oriented when no voltage is applied thereto. VA-mode liquid crystal cells include (1) a VA-mode liquid crystal cell in the narrow sense wherein rod-like liquid crystalline molecules are substantially vertically oriented while no voltage is applied thereto and substantially horizontally oriented while voltage is applied thereto (JP-A-2-176625), (2) an MVA-mode liquid crystal cell wherein VA-mode is modified to be multi-domain type in order to enlarge the viewing angle {SID 97, Digest of Tech. Papers, 28(1997), 845}, (3) an n-ASM-mode liquid crystal cell described in Japan Liquid Crystal Forum (1998), 58-59, in which rod-like liquid crystalline molecules are substantially vertically oriented while voltage is not applied, and the molecules are substantially oriented in twisted multi-domain alignment while voltage is applied, and (4) a liquid crystal cell of SUR-VAIVAL mode (published in LCD International '98).

(IPS-mode Liquid Crystal Display Device)

The IPS-mode liquid crystal display device is characterized in that the rod-like liquid crystalline molecules are oriented substantially within the plane while voltage is not applied and undergo change in orientation direction thereof according to application or non-application of voltage to achieve switching. Specific examples to be used are described in JP-A-2004-365941, JP-A-2004-12731, JP-A-2004-215620, JPA-2002-221726, JP-A-2002-55341 and JP-A-2003-195333.

(Other Liquid Crystal Display Devices)

ECB-mode and STN-mode liquid crystal display devices can also be optically compensated based on the same concept as described above.

EXAMPLES

The present invention is described in more detail with reference to the following examples, but the invention should not be construed as being limited thereto.

[Synthesis of Cellulose Acylate]

Production Example 1

Synthesis of Cellulose Acetate Propionate, P-1

150 g of cellulose (hardwood pulp) and 75 g of acetic acid were placed in a reaction vessel of 5-L separable flask equipped with reflux equipment and, while heating in an oil bath controlled at 60° C., the mixture was vigorously stirred for 2 hours. The thus-pretreated cellulose was in a swollen and broken state to give fluffy appearance. The reaction vessel was placed in a 2° C. ice-water bath for 30 minutes to cool.

Separately, a mixture of 1,545 g of propionic anhydride and 10.5 g of sulfuric acid was prepared as an acylating agent and, after cooling to –30° C., added at a time to the reaction vessel retaining the pre-treated cellulose. After 30 minutes, the outer temperature was gradually raised so that the inside temperature reached 25° C. 2 hours after the addition of the acylating agent. The reaction vessel was then cooled in a 5° C. ice-water bath and the inside temperature was adjusted so that the inside temperature became 10° C. 0.5 hour after the addition of the acylating agent and became 23° C. 2 hours after the addition, followed by stirring for further 3 hours with keeping the inside temperature at 23° C. Then, the reaction vessel was cooled in a 5° C. ice-water bath, and 120 g of aqueous acetic acid containing 25% by weight of water cooled to 5° C. was added to the vessel over 1 hour. The inside temperature was raised to 40° C., followed by stirring for 1.5 hours. Subsequently, to the reaction vessel was added a solution prepared by dissolving magnesium acetate tetrahydrate in acetic acid containing 50% by weight of water in an amount of 2-fold mols per mol of sulfuric acid, followed by stirring for 30 minutes. 1L of acetic acid containing 25% by weight of water, 500 mL of acetic acid containing 33% by weight of water, 1L of acetic acid containing 50% by weight of water and 1L of water were added to the vessel in this order to precipitate cellulose acetate propionate. The thus-obtained precipitate of cellulose acetate propionate was washed with warm water. Cellulose acetate propionates containing various amounts of residual sulfate were obtained by changing the washing condition as shown in Table 1. After washing, cellulose acetate propionate was stirred for 0.5 hour in a 20° C. aqueous solution containing 0.005% by weight of calcium hydroxide and, after further washing with water till pH of the washing solution became 7, vacuum dried at 70° C.

Measurement of $^1$H-NMR and GPC revealed that the thus-obtained cellulose acetate propionate has an acetylation degree of 0.30, a propionylation degree of 2.63 and a polymerization degree of 320.

Production Example 2

Synthesis of Cellulose Acetate Butyrate, B-1

100 g of cellulose (hardwood pulp) and 135 g of acetic acid were placed in a reaction vessel of 5-L separable flask equipped with reflux equipment and, while heating in an oil bath controlled at 60° C., the mixture was left for 1 hour. Then, while heating in an oil bath controlled at 60° C., the mixture was vigorously stirred for 1 hour. The thus-pretreated cellulose was in a swollen and broken state to give fluffy appearance. The reaction vessel was placed in a 5° C. ice-water bath for 1 hour to sufficiently cool cellulose.

Separately, a mixture of 1,080 g of butyric anhydride and 10.0 g of sulfuric acid was prepared as an acylating agent and, after cooling to –20° C., added at a time to the reaction vessel retaining the pre-treated cellulose. After 30 minutes, the outer temperature was raised to 20° C., and reaction was conducted for 5 hours. The reaction vessel was then cooled in a 5° C. ice-water bath, and 2,400 g of aqueous acetic acid containing 12.5% by weight of water and cooled to 5° C. was added to the vessel over 1 hour. The inside temperature was raised to 30° C., followed by stirring for 1 hour. Subsequently, to the reaction vessel was added 100 g of a solution prepared by dissolving magnesium acetate tetrahydrate in a solution of acetic acid containing 50% by weight of water, followed by stirring for 30 minutes. 1,000 g of acetic acid and 2,500 g of aqueous acetic acid containing 50% by weight of water were gradually added to the vessel to precipitate cellulose acetate butyrate. The thus-obtained precipitate of cellulose acetate butyrate was washed with warm water. Cellulose acetate butyrates containing various amounts of residual sulfate were obtained by changing the washing condition as shown in Table 1. After washing, cellulose acetate butyrate was stirred for 0.5 hour in an aqueous solution containing 0.005% by weight of calcium hydroxide and, after further washing with water till pH of the washing solution became 7, vacuum dried at 70° C. The thus-obtained cellulose acetate butyrate had an acetylation degree of 0.84, a butyrylation degree of 2.12 and a polymerization degree of 268.

Production Example 3

Synthesis of Cellulose Acetate, A-1

100 g of cellulose (hardwood pulp) and 50 g of acetic acid were placed in a reaction vessel of 500-ml separable flask equipped with reflux equipment and, while heating in an oil bath controlled at 60° C., the mixture was vigorously stirred for 2 hours. The thus-pretreated cellulose was in a swollen and broken state to give fluffy appearance. The reaction vessel was placed in a 5° C. ice-water bath for 1 hour to sufficiently cool cellulose.

Separately, a mixture of 790 g of acetic anhydride and 10.0 g of sulfuric acid was prepared as an acylating agent and, after cooling to −20° C., added at a time to the reaction vessel retaining the pre-treated cellulose. After 30 minutes, the outer temperature was raised to 20° C., and reaction was conducted for 3 hours. The reaction vessel was then cooled in a 5° C. ice-water bath, and 120 g of aqueous acetic acid containing 25% by weight of water was added thereto over 30 minutes. The inside temperature was raised to 60° C., followed by stirring for 2 hour. Subsequently, to the reaction vessel was added 100 g of a solution prepared by dissolving magnesium acetate tetrahydrate in aqueous acetic acid containing 50% by weight of water, followed by stirring for 30 minutes. 750 g of aqueous acetic acid containing 25% by weight of water and 2,500 g of water were gradually added to the vessel to precipitate cellulose acetate. The thus-obtained precipitate of cellulose acetate was sufficiently washed with 70° C. warm water. After washing, cellulose acetate was stirred for 0.5 hour in an aqueous solution containing 0.005% by weight of calcium hydroxide and washed with water till pH of the washing solution became 7. The thus-obtained cellulose acetate was vacuum dried at 70° C. The thus-obtained cellulose acetate had an acetylation degree of 2.85 and a polymerization degree of 284.

Production Example 4

Synthesis of Cellulose Acetate Propionates, P-2, P-3 and P-4; and Cellulose Acetate Butyrates B-2, B-3 and B-4

In the same manner as in Production Examples 1 and 2, there were synthesized cellulose acetate propionates, P-2, P-3 and P-4; and cellulose acetate butyrates B-2, B-3 and B-4. Physical values of respective samples are shown in Table 1.

The contents of sulfate in the compounds obtained in Production Examples 1 to 4 were measured by the trace coulometric titration method using a trace sulfur analyzer, TOX-10Σ, manufactured by Mitsubishi Kagaku. Also, ashing of each sample was conducted by adding nitric acid and applying microwave. Then, the resultant ash was dissolved in water, and amounts of calcium and magnesium were measured according to ICP-OES method, and amounts of sodium and potassium were measured by AAS/flame test. Substitution degree, polymerization degree, amount of residual sulfate (in terms of amount of sulfur atom) and amounts of calcium, magnesium, sodium and potassium are shown in Table 1. Additionally, all of the compounds of Production Examples 1 to 4 had the metal/sulfur equivalent ratio calculated according to the numerical formula (5) between 0.25 and 3.

Also, the ratio of weight-average polymerization degree/number-average polymerization degree of each of the compounds of Production Examples 1 to 4 was measured and calculated according to GPC method, and it was found that the ratios of all compounds were in the range of from 1.9 to 3.05. The bulk density was measured according to JIS K-7365 and was found to be in the range of from 0.7 to 1.12.

TABLE 1(A)

| No. of Production Example | Sample No. | A | B | Polymerization Degree | Washing Condition |
|---|---|---|---|---|---|
| Production Example 1 | P-1-1 | 0.3 | propionyl = 2.63 | 320 | 70° C., 10 min |
| Production Example 1 | P-1-2 | 0.3 | propionyl = 2.63 | 320 | 30° C., 30 min |
| Production Example 1 | P-1-3 | 0.3 | propionyl = 2.63 | 320 | 40° C., 60 min |
| Production Exmple 1 | P-1-4 | 0.3 | propionyl = 2.63 | 320 | 40° C., 120 min |
| Production Example 1 | P-1-5 | 0.3 | propionyl = 2.63 | 320 | 70° C., 40 min |
| Production Example 1 | P-1-6 | 0.3 | propionyl = 2.63 | 320 | 70° C., 60 min |
| Production Example 1 | P-1-7 | 0.3 | propionyl = 2.63 | 320 | 70° C., 120 min |
| Production Example 1 | P-1-8 | 0.3 | propionyl = 2.63 | 320 | 70° C., 180 min |
| Production Example 2 | B-1-1 | 0.84 | butyryl = 2.12 | 268 | 70° C., 10 min |
| Production Example 2 | B-1-2 | 0.84 | butyryl = 2.12 | 268 | 70° C., 60 min |
| Production Example 2 | B-1-3 | 0.84 | butyryl = 2.12 | 268 | 70° C., 120 min |
| Production Example 2 | B-1-4 | 0.84 | butyryl = 2.12 | 268 | 70° C., 180 min |
| Production Example 3 | A-1 | 2.85 | — | 284 | 70° C., 240 min |
| Production Example 4 | P-2 | 2.21 | propionyl = 0.67 | 290 | 70° C., 200 min |
| Production Example 4 | P-3 | 1.77 | propionyl = 1.01 | 320 | 70° C., 200 min |
| Production Example 4 | P-4 | 1.01 | propionyl = 1.75 | 340 | 70° C., 200 min |
| Production Example 4 | B-2 | 2.11 | butyryl = 0.61 | 320 | 70° C., 200 min |
| Production Example 4 | B-3 | 1.75 | butyryl = 1.03 | 310 | 70° C., 200 min |
| Production Example 4 | B-4 | 1.12 | butyryl = 1.65 | 289 | 70° C., 200 min |

TABLE 1(B)

| No. of Production Example | Amount of Residual Sulfuric Acid (ppm) | Ca (ppm) | Mg (ppm) | Na (ppm) | K (ppm) | Note |
|---|---|---|---|---|---|---|
| Production Example 1 | 920 | 36 | 390 | 5 | ≦1 | Comparative Example |
| Production Example 1 | 730 | 43 | 280 | 7 | ≦1 | Comparative Example |
| Production Example 1 | 570 | 23 | 210 | 3 | ≦1 | Comparative Example |
| Production Exmple 1 | 440 | 43 | 150 | 6 | ≦1 | Present Invention |
| Production Example 1 | 280 | 34 | 90 | 3 | ≦1 | Present Invention |
| Production Example 1 | 150 | 32 | 65 | 7 | ≦1 | Present Invention |

TABLE 1(B)-continued

| No. of Production Example | Amount of Residual Sulfuric Acid (ppm) | Ca (ppm) | Mg (ppm) | Na (ppm) | K (ppm) | Note |
|---|---|---|---|---|---|---|
| Production Example 1 | 100 | 21 | 25 | 4 | ≦1 | Present Invention |
| Production Example 1 | 70 | 15 | 15 | 3 | ≦1 | Present Invention |
| Production Example 2 | 1060 | 66 | 470 | 5 | ≦1 | Comparative Example |
| Production Example 2 | 240 | 32 | 90 | 7 | ≦1 | Present Invention |
| Production Example 2 | 140 | 41 | 50 | 5 | ≦1 | Present Invention |
| Production Example 2 | 90 | 21 | 30 | 5 | ≦1 | Present Invention |
| Production Example 3 | 60 | 23 | 25 | 6 | ≦1 | Comparative Example |
| Production Example 4 | 70 | 31 | 25 | 3 | ≦1 | Present Invention |
| Production Example 4 | 80 | 27 | 35 | 6 | ≦1 | Present Invention |
| Production Example 4 | 70 | 31 | 25 | 9 | ≦1 | Present Invention |
| Production Example 4 | 90 | 34 | 30 | 4 | ≦1 | Present Invention |
| Production Example 4 | 80 | 23 | 40 | 5 | ≦1 | Present Invention |
| Production Example 4 | 90 | 38 | 35 | 7 | ≦1 | Present Invention |

Examples 1-1 to 1-14 and Comparative Examples 1-1 to 1-5

(1) Preparation of Cellulose Acylate

Cellulose acylates were prepared as described in Production Examples 1 to 4.

(2) Pelletization of Cellulose Acylate

The cellulose acylate was blast-dried at 120° C. for 3 hours to a water content of 0.1% by weight measured by Karl Fischer's method, and a plasticizer selected from those described below was added thereto and, further, 0.05% by weight of silicon dioxide fine particles of AEROSEL R972V (manufactured by Nihon Aerosil K.K.) based on the total weight was added thereto.

Plasticizer A: triphenyl phosphate

Plasticizer B: dioctyl adipate

A mixture of these components was kneaded in a hopper of a biaxially kneading extruder. Additionally, this biaxially kneading extruder was equipped with a vacuum vent, and was evacuated in vacuo (to 0.3 atmospheric pressure). After thus melting the mixture, it was extruded into a water bath in a strand shape of 3 mm in diameter and, after dipping for 1 minute (to solidify the strands), the strands were passed through 10° C. water for 30 seconds to decrease the temperature, followed by cutting into pieces of 5 mm in length. The thus-prepared pellets were dried at 100° C. for 10 minutes, then sacked.

(3) Melt-cast Film Production

The thus-prepared cellulose acylate pellets were dried at 110° C. for 3 hours in a vacuum drier. Then, they were thrown into a hopper adjusted to a temperature 10° C. lower than Tg of the cellulose acylate (Tg−10° C.) and were molten at 190° C. in 5 minutes, followed by filming with a T/D ratio (lip space/thickness of the formed film and the gap between the casting drum (CD) and the die (in terms of percentage of a value obtained by dividing the CD-die distance by the filming width) being as shown in Table 1. In this occasion, films with a desired thickness (D) were obtained by adjusting the speed of the casting drum to T/D times the speed of extrusion.

The temperature of the casting drum was Tg−10° C., and the extruded mixture was solidified thereon to form a film. In this occasion, a method of applying static electricity at each level was employed (a 10-kV wire being provided at a position 10 cm spaced from the point at which the molten mixture lands onto the casting drum). The solidified molten mixture was stripped off and, immediately before taking up, trimmed on both sides thereof (5% on each side based on the whole width) and knurled on both sides with a width of 10 mm and a height of 50 μm, followed by being taken up at a rate of 30 m/min to a length of 3,000 m. Each of the thus-obtained non-stretched films had a width of 1.5 m and a thickness shown in Table 2.

(4) Measurement of Physical Properties of Cellulose Acylate Film (4-1) Fine Polarizing Foreign Material A sample film after melt-cast film production or stretching was observed under a polarizing microscope with polarizing films crossing at right angles and with a magnification of 100×. The number of white foreign particles of from 1 μm to less than 10 μm observed was visually counted and was represented in terms of the number of particles per mm$^2$.

(4-2) Measurement of Re and Rth

After conditioning the sample film for 24 hours at 25° C. and 60% in relative humidity, the in-plane retardation value (Re) and the retardation value in the film thickness direction were calculated by measuring retardation values at a wavelength of 590 nm in the vertical direction with respect to the film surface and in the directions with 10° intervals between +50° and −50° with respect to the normal of the film surface with the slow axis as a rotation axis. Unless otherwise specified, Re and Rth represent these values.

(4-3) Coloration (Color Tone)

Coloration of the thus-obtained non-stretched cellulose acylate film was visually observed and evaluated in 5 stages. The results are shown in Table 2. Films evaluated as 1 or 2 are acceptable as commercial products, films evaluated as 3 has a limited use, and films evaluated as 4 or 5 are not suitable as commercial products.

TABLE 2

| | Pellets | | Cellulose Acylate Film | | | | | | |
|---|---|---|---|---|---|---|---|---|---|
| | Cellulose acylate | Plasticizer | Sample No. | Thickness (μm) | ** | Re (nm) | Rth (nm) | Amount of Residual Sulfate (ppm) | Color Tone |
| Comparative Example 1-1 | P-1-1 | A | 1 | 80 | — | — | — | 920 | 5 |
| Comparative Example 1-2 | P-1-2 | A | 2 | 82 | 2 | — | — | 730 | 4 |
| Comparative Example 1-3 | P-1-3 | A | 3 | 81 | 0 | | | 570 | 4 |
| Example 1-1 | P-1-4 | A | 4 | 83 | 1 | 3 | 8 | 440 | 3 |
| Example 1-2 | P-1-5 | A | 5 | 84 | 0 | 3 | 7 | 280 | 2 |
| Example 1-3 | P-1-6 | A | 6 | 78 | 1 | 2 | 8 | 150 | 1 |
| Example 1-4 | P-1-7 | A | 7 | 81 | 1 | 2 | 7 | 100 | 1 |
| Example 1-5 | P-1-8 | B | 8 | 83 | 0 | 1 | 2 | 70 | 1 |
| Comparative Example 1-4 | B-1-1 | A | 9 | 61 | 1 | 1 | 1 | 1060 | 6 |
| Example 1-6 | B-1-2 | A | 10 | 87 | 0 | 1 | 2 | 240 | 2 |
| Example 1-7 | B-1-3 | A | 11 | 61 | 1 | 1 | 1 | 140 | 1 |
| Example 1-8 | B-1-4 | B | 12 | 102 | 0 | 2 | 12 | 90 | 1 |
| Comparative Example 1-5 | A-1 | A | 13 | — | — | — | — | 60 | — |
| Example 1-9 | P-2 | A | 14 | 80 | 0 | 2 | 7 | 70 | 2 |
| Example 1-10 | P-3 | A | 15 | 82 | 0 | 1 | 6 | 80 | 2 |
| Example 1-11 | P-4 | A | 16 | 80 | 0 | 1 | 9 | 70 | 1 |
| Example 1-12 | B-2 | A | 17 | 81 | 0 | 1 | 7 | 90 | 2 |
| Example 1-13 | B-3 | A | 18 | 80 | 0 | 1 | 7 | 80 | 2 |
| Example 1-14 | B-4 | A | 19 | 83 | 1 | 1 | 8 | 90 | 1 |

** Fine foreign material (particles/mm$^2$)

Additionally, samples with a large coloration, measurement of fine foreign material, Rth and Re was too difficult to conduct. The sample of Comparative Example 1-5 prepared from cellulose acetate A-1 of Production Example 3 which is outside the scope of the invention with respect to substitution degree had such a high melting point that pelletization and melt-cast film production were impossible.

It is seen that samples of Examples 1-1 to 1-5, samples of Examples 1-6 to 1-8 and samples of Examples 1-9 to 1-14 prepared from the cellulose acylates within the scope of the invention had a good coloration and suffered less coloration. In contrast, it is seen that samples of Comparative Examples 1-1, 1-2, 1-3 and 1-4 showed such a large coloration that they were not appropriate as optical films.

It is further seen that, of the samples of Examples 1-1 to 1-5 and Examples 1-6 to 1-8, samples of Examples 1-2 to 1-5 and samples of Examples 1-6 to 1-8 showed a less coloration, with samples of Examples 1-3 to 1-5, Examples 1-7 and 1-8 being particularly good.

It is further seen that, from the comparison among samples of Examples 1-5, 1-9, 1-10 and 1-11 and among samples of Examples 1-8, 1-12, 1-13 and 1-14, the effects of the invention are particularly remarkable with cellulose acylates having a high propionyl or butyryl substitution degree even when the amount of residual sulfate is about the same.

Example 2

[Preparation of a Polarizing Plate]

(1) Stretching of a Cellulose Acylate Film (Preparation of Retardation Film)

The non-stretched cellulose acylate films described in Example 1 were stretched 15% in the longitudinal direction at a rate of 100%/sec and 50% in the transverse direction (vertical to the longitudinal direction) at a rate of 20%/sec at a temperature 10° C. higher than Tg of the respective cellulose acylate films. Additionally, Tg was measured according to the method to be described hereinafter.

As a method of such stretching, either a successive stretching method of conducting longitudinal stretching then conducting transverse stretching or a simultaneous biaxially stretching method of stretching simultaneously in the longitudinal and transverse directions is selected.

Retardation values after stretching are shown below.
Sample No. 4: Re=50 nm, Rth=100 nm
Sample No. 5: Re=60 nm, Rth=120 nm
Sample No. 6: Re=40 nm, Rth=100 nm
Sample No. 7: Re=50 nm, Rth=160 nm
Sample No. 8: Re=60 nm, Rth=170 nm
Sample No. 10: Re=70 nm, Rth=130 nm
Sample No. 11: Re=60 nm, Rth=140 nm
Sample No. 12: Re=70 nm, Rth=220 nm (Measurement of Tg)

20 mg of a sample was placed in a measurement pan. This was heated from 30° C. to 250° C. at a rate of 10° C./min in a nitrogen stream ($1^{st}$-run), then cooled to 30° C. at a rate of −10° C./min. Then, the temperature was again raised from 30° C. to 250° C. ($2^{nd}$-run). Tg determined in the $2^{nd}$-run (temperature at which the base line deviates from the low temperature side) was used.

(2) Saponification Treatment of a Cellulose Acylate Film

The non-stretched films and the stretched films were saponified by the following dip-saponifying method.

(i) Dip Saponification

A 1.5 mol/L aqueous solution of NaOH was used as a saponifying solution.

This solution was adjusted to 60° C. in temperature, and the cellulose acylate film was dipped therein for 2 minutes.

Thereafter, the film was dipped in a 0.05 mol/L aqueous solution of sulfuric acid for 30 seconds, and passed through a water-washing bath.

Additionally, the following coat-saponifying method was also conducted to obtain the same results as with the dip-saponifying method.

(ii) Coat Saponification

20 Parts by weight of water was added to 80 parts by weight of isopropyl alcohol, and KOH was dissolved therein so that its concentration became 1.5 mol/L. This solution was adjusted to 60° C. in temperature to use as a saponifying solution.

This solution was coated on a 60° C. cellulose acylate film in an amount of 10 g/m$^2$, and saponification was conducted for one minute. Then, 50° C. warm water was sprayed thereover for 1 minute in an amount of 10 L/m$^2$·min to conduct washing.

(3) Preparation of a Polarizing Film

The film was stretched in the longitudinal direction by giving a difference in peripheral speed between two pairs of nip rolls according to Example 1 in JP-A-2001-141926.

(4) Lamination (Preparation of Polarizing Plate)

The thus-obtained polarizing film and the saponification-treated non-stretched or stretched cellulose acylate film and saponification-treated FUJI TAC (non-stretched triacetate film; manufactured by Fuji Photo Film Co., Ltd.) were laminated one over the other so that the angle between the polarizing axis and the longitudinal direction of the cellulose acylate film became 45°, using a 3% by weight aqueous solution of PVA (PVA-117H; manufactured by K.K. Kuraray) as an adhesive.

Polarizing plate A: stretched cellulose acylate film/polarizing film/non-stretched cellulose acylate film Polarizing plate B: stretched cellulose acylate film/polarizing film/FUJI TAC Polarizing plat C: stretched cellulose acylate film/polarizing film/stretched cellulose acylate film Additionally, as the non-stretched cellulose acylate film, the non-stretched film of the same level was used.

(5) Preparation of a Liquid Crystal Display Device

The amount of light leakage was measured according to the following method using a liquid crystal display device obtained by using the retardation film-having polarizing plate A, B or C in place of the polarizing plate in a 15-inch display, VL-1530S (VA system), manufactured by Fujitsu K.K. As a result, every liquid crystal display device using the stretched film of the invention suffered only slight leakage of light, thus good liquid crystal display devices being obtained.

(Method for Measuring Amount of Light Leakage)

Each of the liquid crystal display devices was allowed to display a black image in an atmosphere of 25° C. and 10% RH to 80% RH, and leakage of light was visually evaluated. The proportion of areas where leakage of light occurred was relatively evaluated based on the total area.

Further, when the polarizing plate of Example 1 in the evaluation test of JP-A-10-48420 was replaced by the polarizing plate A, B or C having the retardation film using the cellulose acylate film of the invention and the resulting polarizing plate was used in a TFT-type liquid crystal display device, liquid crystal display devices showing good performance were obtained. Also, when the retardation film-having polarizing plate A, B or C was used in a VA-type liquid crystal display device described in FIGS. 2 to 9 of JP-A-2000-154261, an OCB-type liquid crystal display device described in FIGS. 10 to 15 of JP-A-2000-15426 or IPS-type liquid crystal display device described in FIG. 11 of JP-A-2004-12731, liquid crystal display devices with good performance suffering no leakage of light were obtained.

(6) Preparation of an Optical Compensatory Film

A good optical compensatory film was prepared by forming a liquid crystal layer in the same manner using the stretched cellulose acylate film of the invention in place of the cellulose acetate film described in Example 1 of JP-A-11-316378.

A good optical compensatory film was prepared by forming an optical compensatory film using the stretched cellulose acylate film of the invention in place of the cellulose acetate film having a liquid crystal layer described in Example 1 of JP-A-7-333433.

Example 3

[Preparation of an Anti-reflective Film]

Good optical properties were obtained by preparing an anti-reflective film using the stretched cellulose acylate film of the invention according to Example 47 of Hatsumei Kyokai Kokai Giho (Kogi Bango 2001-1745).

Further, when the anti-reflective film of the invention was laminated on the outermost layer in the TFT-type liquid crystal display device in the evaluation test of JP-A-10-48420, the VA-type liquid crystal display device described in FIGS. 2 to 9 of JP-A-2000-154261 or in the OCB-type liquid crystal display device described in FIGS. 10 to 15 of JP-A-2000-154261 and evaluated, there were obtained good liquid crystal display devices.

Also, the opposite side of the anti-reflective film of the invention to the side on which the anti-reflective layer was provided was saponified according to a coat-saponifying method, and was laminated on the polarizing film prepared in (3) of Example 2 so that the angle between the polarizing axis and the longitudinal direction of the cellulose acylate film became 45° using a 3% by weight aqueous solution of PVA (PVA-117H manufactured by K.K. Kuraray) as an adhesive. On the opposite side of the polarizing film to the side on which the anti-reflective film was laminated was laminated a stretched cellulose acylate film of the same level not having the anti-reflective layer using the above-mentioned adhesive. When the polarizing plate having the anti-reflective film of the invention was used in a TFT-type liquid crystal display device in place of the polarizing plate of Example 1 in the evaluation test of JP-A-10-48420, a liquid crystal display device having good performance was obtained.

Example 4

A cotton-shaped sample B-4-2 of 0.40 in bulk density was obtained in the same manner as with Sample B-4 (bulk density: 0.82; fine particles) of Production Example 4 except for changing the re-precipitating condition so that a dope diluted with acetic acid was added into a poor solvent through fine pores. When pelletization of the thus-obtained sample B-4-2 was tried, it was difficult to remove bubbles, and kneading took time. However, pellets were obtained. The pellets were subjected to the melt-cast film production process according to the process described in Example 1 to prepare a cellulose acylate film. The resultant film showed the same good performance as in Examples 1-14 with respect to fine foreign material, Re and Rth, though color tone being evaluated as 2.

Also, sample P-4 of Production Example 4 (weight-average polymerization degree/number-average polymerization degree=2.5) was subjected to repeated procedures of redissolution into acetic acid and precipitation with water to produce sample P-4-2 of 1.5 in weight-average polymerization degree/number-average polymerization degree. The yield was 30% or less in comparison with sample P-4. Thus, sample P-4-2 was not suited in the point of industrial profit. The thus-obtained sample P-4-2 was palletized according to Example 1, and the pellets were subjected to the melt-cast film production process described in Example 1 to prepare a cellulose acylate film. The resultant film showed the same good properties as in Example 1-11 with respect to fine foreign material, Re, Rth and color tone.

Example 5

Sample P-1-9 was prepared in the same manner as with sample P-1-8 of Production Example 1 (metal/sulfur equivalent ratio=0.49) except for changing the amount of magnesium acetate tetrahydrate upon neutralization to two times that in Production Example 1, changing the concentration of the calcium hydroxide aqueous solution to 0.01% by weight and eliminating washing with water before drying and after treatment with the calcium hydroxide aqueous solution. The metal/sulfur equivalent ratio calculated according to the numerical formula (5) was 4.0. The thus-obtained sample P-1-9 was palletized according to Example 1, and the pellets were subjected to the melt-cast film production process described in Example 1 to prepare a cellulose acylate film. The resultant film showed fine foreign material level, Re, Rth and color tone within preferred ranges of the invention. Color tone was evaluated as 2, and was slightly inferior to that of the cellulose acylate film prepared from P-1-8. Further, the resultant film gave slight turbidity which does not matter as a commercial product, and its quality was slightly inferior to that of the cellulose acylate film prepared from P-1-8.

Example 6

Sample P-1-10 was prepared in the same manner as with sample P-1-8 of Production Example 1 except for changing the amount of magnesium acetate tetrahydrate upon neutralization to 4 times that in Production Example 1, changing the concentration of the calcium hydroxide aqueous solution to 0.05% by weight and eliminating washing with water before drying and after treatment with the calcium hydroxide aqueous solution. This sample contained the residual acid radical in a content of 70 ppm and, as to residual metals, contained 700 ppm of calcium, 480 ppm of magnesium, 10 ppm of sodium and 1 ppm or less of potassium. The metal/sulfur equivalent ratio calculated according to the numerical formula (5) was 17.2. The thus-obtained sample P-1-10 was palletized according to Example 1, and the pellets were subjected to the melt-cast film production process described in Example 1 to prepare a cellulose acylate film. The resultant film showed fine foreign material level, Re and Rth within preferred ranges of the invention. Color tone was evaluated as 2, and was slightly inferior to that of the cellulose acylate film prepared from P-1-8. However, the resultant film gave slight turbidity which can matter for some uses, and its quality was inferior to that of the cellulose acylate film prepared from P-1-8.

Example 7

(1) Pelletization of Cellulose Acylate

Cellulose acylates described in Table 3 were synthesized by changing each of the acylating agents described in Production Examples of Example 1 to a mixture of acetic anhydride, propionic anhydride, acetic acid, propionic acid and sulfuric acid, with changing the ratio of acetyl/propionyl ratio of the acylating agent and the reaction temperature. The sum of the amounts of residual metals, M1+M2, in every cellulose acylate was 800 ppm or less. As comparative examples, cellulose acylate P-1-1 (Comparative Example 1) and P-1-2 (Comparative Example 2) of Example 1 outside the scope of the invention were used. These cellulose acylates were blast-dried at 120° C. for 3 hours to adjust the water content to 0.1% by weight. To each of them were added a plasticizer described in Table 3, 0.05% by weight of silicon dioxide fine powders (Aerosil R72V), 0.20% by weight of a phosphite-based stabilizer (P-1), 0.8% by weight of UV ray absorbent a (2,4-bis-(n-octylthio)-6-(4-hydroxy-3,5-di-tert-butylanilino)-1,3,5-triazine) and 0.25% by weight of UV ray absorbent b 2(2'-hydroxy-3',5'-di-tert-butylphenyl)-5-chlorobenzotriazole, and the resulting mixture was melt-kneaded at 190° C. using a biaxial kneading extruder. Additionally, this biaxial kneading extruder was equipped with a vacuum vent, and vacuum evacuation (set at 0.3 atmosphere (30.3 kPa)) was conducted. The molten mixture was extruded into a water bath in a strand shape of 3 mm in diameter, followed by cutting into 5-mm long pieces.

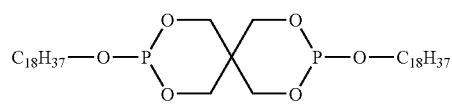

P-1

(2) Melt-cast Film Production

The cellulose acylate pellets prepared by the above-described process were dried for 3 hours in a 100° C. vacuum drier. They were thrown into a hopper adjusted to a temperature of Tg–10° C., followed by melt-extruding the cellulose acylate a using a uniaxial extruder with a screw of 3.0 in compression ratio and with the following temperature pattern:

Screw temperature pattern: upper stream feeing zone (180-195° C.); middle compression zone (200-210° C.); lower stream metering zone (210-240° C.).

Next, the molten cellulose acylate was introduced into a gear pump to remove pulsation of the extruder, then filtered through a 3-μm filter and cast onto a cast drum through a 230° C. die. In this occasion, a 3-kV electrode was provided at a position 5 cm spaced from the melt, and static electricity-applying treatment was conducted with both sides with a width of 5 cm from the edge. The cast mixture was passed over three-roll casting drums of 60 cm in diameter set at Tg–5° C., Tg and Tg–10C, respectively to solidify, thus cellulose acetate films having a thickness described in Table 3 being obtained. After trimming 5 cm from both side edges, knurling processing of 10 mm in width and 50 μm in height was conducted on both sides. Thus, a sample of 1.5 m in width, 30 m/min in filming speed and 2,000 m coil was taken with each level. There were obtained cellulose acylate films having excellent surface state with no die streak or no corrugation on the film surface.

Re and Rth of each of the thus-obtained non-stretched cellulose acylate film of the invention were measured and given in Table 3. In Table 3, coloration of the film was evaluated in 5 ranks. Samples ranked 1 suffered almost no coloration, samples ranked 2 suffered slight observable coloration, samples ranked 3 suffered observable coloration, samples ranked 4 suffered observable middle coloration, and samples ranked 5 suffered observable serious coloration. Levels acceptable as optical film are 1 and 2. None of the films of the present invention suffered coloration, thus showing excellent performance. As to other physical properties, haze was 0.15%, and molecular orientation axis was 0.3°. As to the fine foreign material, number of particles of 0.02 mm or less in length was 1 particle/m² or less, and no particles of from 0.02 to 0.05 mm existed, thus the films having excellent properties for optical use. On the other hand, the cellulose acylate films of Comparative Examples produced by the process outside the scope of the invention suffered coloration due to thermal decomposition, thus being inferior with respect to properties as optical film.

(3) Preparation of Polarizing Plate (3-1) Saponification of Cellulose Acetate Film The cellulose acylate film was saponified according to the following method. That is, a 2.5 mol/L NaOH aqueous solution was used as a saponifying solution. This solution was adjusted to 60° C., and the cellulose acylate film was dipped therein for 2 minutes. Thereafter, the film was dipped in a 0.05 mol/L sulfuric acid aqueous solution for 30 seconds, then washed with water.

(3-2) Preparation of a Polarizing Layer

The film was stretched in the longitudinal direction by giving two pairs of nip rolls a difference in peripheral speed according to Example I in JP-A-2001-141926, thus a polarizing layer of 20 µm in thickness being prepared.

(3-3) Lamination

The thus-obtained polarizing layer and the saponification-treated non-stretched and stretched cellulose acylate film and saponification-treated FUJI TAC (non-stretched triacetate film) were laminated one over the other in the direction of stretching the polarizing film and the melt-cast film direction of the cellulose acylate film (longitudinal direction), using a 3% by weight aqueous solution of PVA (PVA-117H; manufactured by K.K. Kuraray) as an adhesive.

Polarizing plate A: non-stretched cellulose acylate film/polarizing film/FUJI TAC TD80U Polarizing plate B: non-stretched cellulose acylate film/polarizing film/non-stretched cellulose acylate film (3-4) Evaluation in a Display Device Of two pairs of polarizing plates sandwiching a liquid crystal layer and being placed in 26-inch and 40-inch liquid crystal display devices wherein a VA-type liquid crystal cell was used, one polarizing plate on the viewer's side was delaminated and, instead, the above-described polarizing plate A or B was laminated. The polarizing plate on the viewer's side and the polarizing plate on the backlight side were provided so that their transparent axes cross at right angles, thus a liquid crystal display device being prepared. Leakage of light to be caused in a black display state, uneven coloration and uniformity in the plane were observed with the thus formed liquid crystal display device. In Table 3, "O" in the column of evaluation shows that the sample suffered almost no leakage of light and no uneven coloration and had uniformity in the plane free of problems as a commercial product, "Δ" shows that the sample suffered leakage of light and uneven coloration, which can provide difficulties with some commercial products, and "x" shows that the sample suffered so serious leakage of light and uneven coloration that it is not suitable as a commercial product. The cellulose acylate film of the invention suffered no leakage of light and no uneven coloration, thus showing good properties. Also, the cellulose acylate film of the invention underwent no change in color tone, and is therefore extremely excellent.

(3-5) Preparation of a Low-reflective Film

A low-reflective film prepared from the cellulose acylate film according to Example 47 in Hatsumei Kyokai Kokai Giho (Kogi Bango 2001-1745) showed good optical performance.

(3-6) Preparation of an Optical Compensatory Film

A liquid crystal layer was coated on the cellulose acylate film of the invention according to Example 1 in JP-A-11-316378 to obtain a good optical compensatory film.

TABLE 3(A)

| | Cellulose Acylate | | | | |
|---|---|---|---|---|---|
| | A Substitution Degree of Acetyl | B Substitution Degree of Other Group Than Acetyl | Substituent Other Than Acetyl | A + B Total Substitution Degree | Amount of Sulfuric Acid (ppm) |
| Example 1 | 0.11 | 2.81 | propionyl | 2.92 | 70 |
| Example 2 | 0.20 | 2.60 | propionyl | 2.80 | 98 |
| Example 3 | 0.25 | 2.53 | propionyl | 2.78 | 120 |
| Example 4 | 0.40 | 2.30 | propionyl | 2.70 | 185 |
| Example 5 | 0.70 | 1.90 | propionyl | 2.60 | 100 |
| Example 6 | 1.10 | 1.40 | propionyl | 2.50 | 280 |
| Example 7 | 1.60 | 1.25 | propionyl | 2.85 | 75 |
| Example 8 | 0.05 | 2.90 | propionyl | 2.95 | 60 |
| Example 9 | 0.20 | 2.00 | propionyl | 2.20 | 190 |
| Example 10 | 0.10 | 1.95 | propionyl | 2.05 | 135 |
| Example 11 | 0.20 | 2.60 | butyryl | 2.80 | 205 |
| Example 12 | 1.10 | 1.72 | butyryl | 2.82 | 160 |
| Comparative Example 1 | 0.30 | 2.63 | propionyl | 2.93 | 920 |
| Comparative Example 2 | 0.30 | 2.63 | propionyl | 2.93 | 730 |

TABLE 3(B)

|  | Plasticizer | | Non-stretched Film | | | Layer Structure of | Other Physical Properties | |
|---|---|---|---|---|---|---|---|---|
|  | Kind | Amount | Thickness (μm) | Re (nm) | Rth (nm) | Polarizing Plate | Coloration | Evaluation |
| Example 1 | Plasticizer 4 | 6.0 | 100 | 2 | 19 | polarizing plate A | 1 | ○ |
| Example 2 | " | 8.0 | 85 | 1 | 9 | " | 1 | ○ |
| Example 3 | " | 10.0 | 88 | 6 | 14 | polarizing plate B | 1 | ○ |
| Example 4 | Plasticizer 3 | 6.0 | 80 | 3 | 36 | " | 1 | ○ |
| Example 5 | " | 9.0 | 90 | 5 | 39 | polarizing plate A | 1 | ○ |
| Example 6 | " | 12.0 | 97 | 5 | 42 | " | 2 | ○ |
| Example 7 | Plasticizer 1 | 6.0 | 88 | 7 | 80 | " | 1 | ○ |
| Example 8 | none | 0.0 | 96 | 3 | 32 | " | 1 | ○ |
| Example 9 | Plasticizer 2 | 15.0 | 75 | 3 | 41 | polarizing plate B | 1 | ○ |
| Example 10 | Plasticizer 4 | 20.0 | 140 | 2 | 18 | " | 1 | ○ |
| Example 11 | " | 8.0 | 75 | 2 | 65 | polarizing plate A | 1 | ○ |
| Example 12 | " | 6.0 | 80 | 8 | 57 | " | 1 | ○ |
| Comparative Example 1 | " | 6.0 | 85 | 14 | 75 | " | 5 | x |
| Comparative Example 2 | " | 6.0 | 85 | 16 | 77 | " | 4 | x |

Plasticizer 1: biphenyldiphenyl phoaphste
Plasticizer 2: Dioctyl adipate
Plasticizer 3: Glycerin diacetate monooleate
Plasticizer 4: Polyethylene glycol (molecular weight: 600)

According to the invention, there are provided a cellulose acylate film being suited for optical film and having an excellent transparency, which is produced by the melt-cast film production process and which does not cause coloration, and a process for its production. Further, the invention provides a high-quality retardation film, a polarizing plate, an optical compensatory film, an antireflective film and an image display device from the acylate film.

The entire disclosure of each and every foreign patent application from which the benefit of foreign priority has been claimed in the present application is incorporated herein by reference, as if fully set forth.

What is claimed is:

1. A process for producing a cellulose acylate film, the process comprising:
   melt-cast filming a composition comprising a cellulose acylate that has an acyl substitution degree satisfying numerical formulae (1) to (3), and a residual sulfate in an amount of from 0 to 500 ppm, in terms of an amount of a sulfur atom, $2.0 \leq A+B \leq 3$  numerical formula (1)

$0.25 \leq A \leq 1.7$  numerical formula (2)

$1.0 \leq B \leq 2.75$  numerical formula (3)

wherein A represents a substitution degree of an acetyl group; and
   B represents a sum of a substitution degree of an acyl group having 3 to 7 carbon atoms.

2. The process according to claim 1,
   wherein the acyl group having 3 to 7 carbon atoms in the cellulose acylate is a propionyl group or a butyryl group.

3. The process according to claim 1,
   wherein an amount of the residual sulfate is from 0 to 300 ppm, in terms of an amount of a sulfur atom.

4. The process according to claim 1,
   wherein the cellulose acylate has a plurality of residual metals in an amount of (M1+M2) satisfying numerical formula (4):

$0 \text{ ppm} < M1+M2 < 1000 \text{ ppm}$  numerical formula (4)

wherein M1 represents an amount of an alkali metal; and
   M2 represents an amount of a group II metal.

5. The process according to claim 1,
   wherein the cellulose acylate has a metal/sulfur equivalent ratio that is given by numerical formula (5) in a range of from 0.25 to 3:

metal/sulfur equivalent ratio=((an amount of M1 in terms of moles/2)+an amount of M2 in terms of moles)/an amount of S in terms of moles  numerical formula (5)

wherein M1 represents an amount of an alkali metal;
   M2 represents an amount of a group II metal; and
   S represents an amount of a residual sulfate of the cellulose acylate, in terms of an amount of a sulfur atom.

6. The process according to claim 1,
   wherein the cellulose acylate has a bulk density of from 0.7 to 1.2.

7. The process according to claim 1,
   wherein the cellulose acylate has a weight-average polymerization degree/number-average polymerization degree of from 1.6 to 3.6.

8. A cellulose acylate film produced by a process according to claim 1.

9. The cellulose acylate film according to claim 8, which has an in-plane retardation (Re) and a retardation in a thickness direction (Rth) satisfying numerical formulations (6) to (8):

$Rth \geq Re$  numerical formula (6)

$300 \text{ nm} \geq Re \geq 0 \text{ nm}$  numerical formula (7)

$500 \text{ nm} \geq Rth \geq 0 \text{ nm}$  numerical formula (8).

10. A cellulose acylate film produced by stretching a cellulose acylate film according to claim 8 in at least one direction with a draw ratio of from 1% to 500%.

11. A retardation film comprising a cellulose acylate film according to claim 8.

12. A polarizing plate comprising:
    a polarizing film; and
    two protective films sandwiching the polarizing film, wherein at least one of the two protective films is one of a cellulose acylate film according to claim 8 or a retardation film according to claim 11.

13. An image display device comprising a polarizing plate according to claim 12.

14. An optical compensatory film comprising:

an optically anisotropic layer formed by orienting a liquid crystalline compound on one of a cellulose acylate film according to claim 8 or a retardation film according to claim 11.

15. An image display device comprising an optical compensatory film according to claim 14.

16. An antireflective film comprising:

an antireflective layer on one of a cellulose acylate film according to claim 8 or a retardation film according to claim 11.

17. An image display device comprising an antireflective film according to claim 16.

18. An image display device comprising at least one of a cellulose acylate film according to claim 8, or a retardation film according to claim 11.

* * * * *